United States Patent
King et al.

(10) Patent No.: US 11,889,436 B2
(45) Date of Patent: Jan. 30, 2024

(54) CALIBRATION OF GROUP DELAY IN A MOBILE DEVICE

(71) Applicant: QUALCOMM Incorporated, San Diego, CA (US)

(72) Inventors: Jay King, San Diego, CA (US); Alexander Dorosenco, El Cajon, CA (US); Muhammad Sayed Khairy Abdelghaffar, San Jose, CA (US); Joseph Binamira Soriaga, San Diego, CA (US); Carl Hardin, Encinitas, CA (US); Alexandros Manolakos, San Diego, CA (US); James Krysl, San Diego, CA (US); Michael Allen Kongelf, Los Altos Hills, CA (US); Krishna Kiran Mukkavilli, San Diego, CA (US); Tingfang Ji, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/995,658

(22) Filed: Aug. 17, 2020

(65) Prior Publication Data

US 2022/0053435 A1    Feb. 17, 2022

(51) Int. Cl.
*H04W 56/00* (2009.01)

(52) U.S. Cl.
CPC ...... *H04W 56/0005* (2013.01); *H04W 56/004* (2013.01); *H04W 56/009* (2013.01)

(58) Field of Classification Search
CPC ........... H04W 56/0005; H04W 56/004; H04W 56/009
See application file for complete search history.

(56) References Cited

U.S. PATENT DOCUMENTS

| 6,119,255 A | * | 9/2000 | Akram | G01R 31/2862 324/750.05 |
| 10,292,160 B1 | * | 5/2019 | Marupaduga | H04W 72/1226 |

(Continued)

FOREIGN PATENT DOCUMENTS

JP    0911993 A2  *  4/1999  ............... H04B 7/26

OTHER PUBLICATIONS

International Search Report and Written Opinion—PCT/US2021/042765—ISA/EPO—dated Oct. 22, 2021.

(Continued)

*Primary Examiner* — Stephen J Clawson
(74) *Attorney, Agent, or Firm* — QUALCOMM Incorporated

(57) ABSTRACT

The transmission and reception group delay in a front end structure of a mobile device may be determined using closed loop calibration. The closed loop may be a near field radiated closed loop between pairs of antennas in an antenna array of the mobile device. The delay based on time of transmission and time of reception may be measured for a plurality of pairs of antennas, from which the transmit and receive group delay within a single path may be determined. The propagation delay of the signal between antennas may be included in the group delay calibration for increased accuracy. In another implementation, a conducted closed loop, e.g., in the transceiver or in a radio frequency switching network may be used to calibrate the group delay. Pre-characterization of the delay caused by components between the closed loop and antennas may be included in the group delay calibration for increased accuracy.

29 Claims, 11 Drawing Sheets

(56) References Cited

U.S. PATENT DOCUMENTS

| | | | | |
|---|---|---|---|---|
| 2006/0293066 | A1* | 12/2006 | Edge | H04W 4/029 455/456.3 |
| 2007/0259693 | A1* | 11/2007 | Brunel | H04W 56/009 455/561 |
| 2011/0013677 | A1* | 1/2011 | Ibrahim | H04B 1/406 455/90.1 |
| 2012/0214512 | A1* | 8/2012 | Siomina | H04W 64/00 455/456.2 |
| 2014/0036332 | A1* | 2/2014 | Schulz | G01S 7/4817 359/221.2 |
| 2014/0274160 | A1* | 9/2014 | Xiao | H04W 64/00 455/456.5 |
| 2017/0059689 | A1* | 3/2017 | Edge | G01S 5/0252 |
| 2018/0309525 | A1* | 10/2018 | Peng | H04B 17/318 |
| 2019/0149209 | A1* | 5/2019 | Stang | H04B 17/21 375/299 |
| 2020/0153517 | A1* | 5/2020 | Akkarakaran | H04W 56/004 |

OTHER PUBLICATIONS

Qualcomm Incorporated: "On gNB Requirements for NR Positioning", 3GPP Draft, 3GPP TSG-RAN WG4 Meeting #93, R4-1915183, 3rd Generation Partnership Project (3GPP), Mobile Competence Centre, 650, Route Des Lucioles, F-06921 Sophia-Antipolis Cedex, France, vol. RAN WG4, No. Reno, Nv, USA, Nov. 18, 2019-Nov. 22, 2019, Nov. 8, 2019 (Nov. 8, 2019), XP051819421, pp. 1-7, Retrieved from the Internet: URL: https://ftp.3gpp.org/tsg_ran/WG4_Radio/TSGR4_93/Docs/R4-1915183.zip, R4-1915183—On gNB-requirements for NR positioning.docx, [retrieved on Nov. 8, 2019], p. 5-p. 6, Section 3.

* cited by examiner

CALIBRATION OF GROUP DELAY IN A MOBILE DEVICE

BACKGROUND

The following relates generally to wireless communications, and more specifically to group delay timing accuracy in New Radio (NR).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as NR systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A wireless communications network may implement techniques to keep track of the positioning of a UE in the wireless communications network. In some cases, the UE may transmit or receive positioning reference signals to or from base stations, which the network may use to determine the positioning of the UE. Techniques to accurately perform timing measurements for a positioning reference signal may be deficient.

SUMMARY

The transmission and reception group delay in a front end structure of a mobile device may be determined using closed loop calibration. The closed loop may be a near field radiated closed loop between one or more pairs of antennas in an antenna array of the mobile device. The delay based on the time of transmission of a signal and the time of reception of the signal may be measured for a plurality of pairs, from which the transmit and receive group delay within a single path may be determined. The propagation delay of the signal between antennas may be included in the group delay calibration for increased accuracy. In another implementation, a conducted closed loop, e.g., in the transceiver or in a radio frequency switching network may be used to calibrate the group delay. Pre-characterization of the delay caused by components between the closed loop and antennas may be included in the group delay calibration for increased accuracy.

In one implementation, a method of calibration of group delay in a mobile device in a wireless network, includes sending a first signal on a transmission path; receiving the first signal on a reception path in a closed loop with the transmission path; and determining a transmission and reception group delay based at least a time of transmission of the first signal on the transmission path and a time of arrival of the first signal on the reception path.

In one implementation, a mobile device in a wireless network configured for calibration of group delay, includes a transceiver; a plurality of power amplifiers coupled to the transceiver; a plurality of bandpass filters coupled to the plurality of power amplifiers; an antenna array coupled to the plurality of bandpass filters; at least one processor coupled configured to: send a first signal on a transmission path through one or more of the transceiver, amplifier, bandpass filters, and the antenna array; receive the first signal on a reception path in a closed loop with the transmission path through the one or more of the transceiver, amplifier, bandpass filters, and the antenna array; and determine a transmission and reception group delay based at least a time of transmission of the first signal on the transmission path and a time of arrival of the first signal on the reception path.

In one implementation, a mobile device in a wireless network configured for calibration of group delay, includes means for sending a first signal on a transmission path; means for receiving the first signal on a reception path in a closed loop with the transmission path; and means for determining a transmission and reception group delay based at least a time of transmission of the first signal on the transmission path and a time of arrival of the first signal on the reception path.

In one implementation, a non-transitory storage medium including program code stored thereon, the program code is operable to configure at least one processor in a mobile device in a wireless network configured for calibration of group delay, includes program code to send a first signal on a transmission path; program code to receive the first signal on a reception path in a closed loop with the transmission path; and program code to determine a transmission and reception group delay based at least a time of transmission of the first signal on the transmission path and a time of arrival of the first signal on the reception path.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
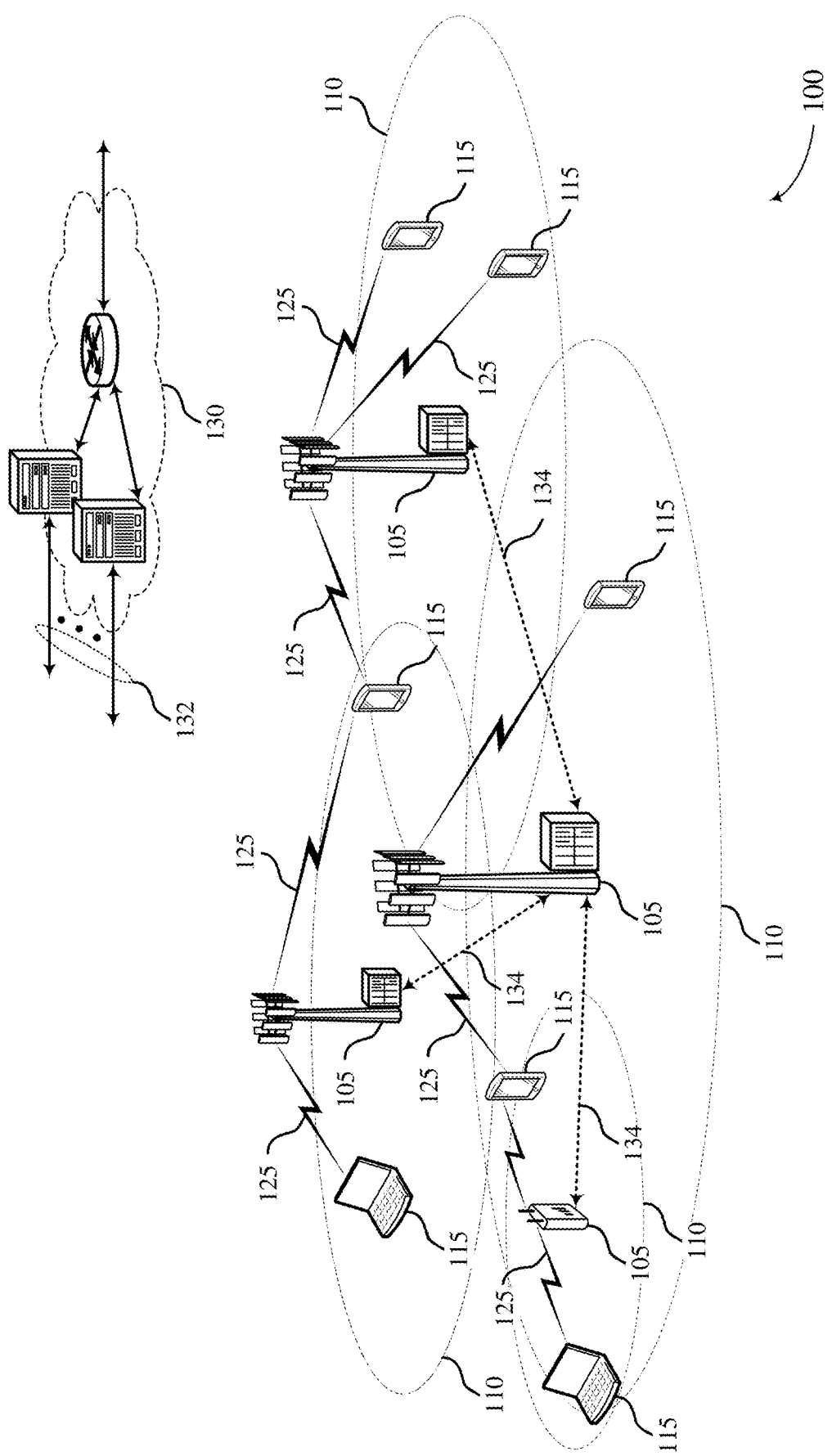
FIG. 1 illustrates an example of a wireless communications system that supports position determination, such as RTT, with group delay calibration.

A user equipment (UE) in a wireless communications system may communicate with one or more base stations. Obtaining the location of a UE that is accessing a wireless communications system may be useful for many applications including, for example, emergency calls, personal navigation, asset tracking, locating a friend or family member, etc. Various positioning techniques may be used to track the UE. In some cases, the UE may be configured to receive a downlink (DL) positioning reference signal (PRS) from the serving base station and one or more neighboring base stations. For example, the UE may perform DL PRS positioning measurements such as reference signal time difference. Additionally or alternatively, a UE may be configured to transmit an uplink (UL) positioning reference signal (PRS), sometimes referred to as sound reference signals (SRS) to the serving base station and one or more neighboring base stations, which may perform positioning measurements on the UL PRS. The UE may generate a position estimate in a position based positioning process using the DL PRS measurements. The UE (and base stations) may transmit measurement reports to a location server that include the position measurements and/or position estimate (if determined), and the location server may determine the UE position in a UE assisted positioning process.

One type of positioning method is round-trip-time (RTT), which uses two-way time-of-arrival measurements, to determine an estimated distance between the UE and a base station. The RTT is the length of time that it takes for a signal to be sent from one entity to another, e.g., from a base station to a user equipment (UE) or vice versa, plus the length of time it takes for a return signal, e.g., an acknowledgement of the initial signal, to be received. The time delay in RTT includes the signal propagation times for the paths between the two communication endpoints, which is proportional to the distance between the two communication endpoints. The time delay further includes processing delays within an endpoint, e.g., to receive, process, and respond to a signal. For an accurate estimation of position, the processing delays are calibrated and removed from an RTT measurement. One source of processing delay that a UE may experience is group delay which may include a part-specific delay, a frequency-specific delay, a path-specific delay, a temperature-specific delay, or any combination thereof. Error in a UE group delay estimate, e.g., in the base band or radio frequency, will directly impact accuracy of positioning measurements, such as RTT.

Disclosed are techniques for calibration of processing delays and in particular for group delay calibration techniques. For example, the transmission and reception group delay in a front end structure of a mobile device may be determined using closed loop calibration. The closed loop calibration may be based on a near field radiated closed loop between one or more pairs of antennas in an antenna array of the mobile device or a conducted closed loop in the transceiver or in a radio frequency switching network. Additional delay, such as the propagation time between antennas in a near field radiated calibration loop, or in components between a conducted closed loop and the antennas may be taken into consideration when determining the transmission and reception group delay.

These techniques and other aspects are disclosed in the following description and related drawings directed to specific aspects of the disclosure. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A mobile device, also referred to herein as a UE, may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates an example of a wireless communications system 100 that supports position determination, such as RTT, with group delay calibration, in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a next generation NodeB (gNB)), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of Ts=1/30,720,000 seconds. Time intervals of a communications resource may be organized according to radio frames each having a duration of 10 milliseconds (ms), where the frame period may be expressed as Tf=307,200 Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE in a wireless communications system may communicate with one or more base stations. Each base station may provide a cell which extends within a coverage area of the base station. The UE may move within the coverage area, and the cell may provide wireless communications (e.g., NR communications, or others) to the UE. A location server in the core network 130 or co-located with a base station may determine or track of the location of the UE. Various positioning techniques may be used to track the UE. In some cases, the UE may be configured to transmit an uplink positioning reference signal, e.g., SRS for positioning, to the serving base station and one or more neighboring base stations. In some examples, the UE may be configured to receive a downlink positioning reference signal from the serving base station and one or more neighboring base stations. In some examples, both uplink and downlink positioning reference signals may be used for positioning, such as with RTT. For an uplink positioning reference signal, the base station and the neighboring base stations may exchange information associated with the receipt of the uplink positioning reference signal, such as reference signal time difference measurements made by the UE. The network (e.g., a location server) may then determine the location of the UE based on the one or more uplink positioning reference signal transmissions. For downlink positioning reference signal transmissions, the UE may receive a positioning reference signal from each of one or more base stations. In some cases, e.g., UE-based positioning, the UE may estimate its positioning based on the measurements, for example based on RTT measurements. Additionally or alternatively, e.g., in UE-assisted positioning, the UE may transmit measurement reports for the one or more positioning reference signals to a location server that may determine or verify the position of the UE.

In some systems, a UE may experience delay in receiving, processing and sending positioning reference signals. For example, a delay may be based on radio frequency front-end processing (such as processing at one or more antennas) at the UE. In some cases, the UE may calibrate the radio frequency front-end group delays such that a measurement report reflects the radio frequency front-end group delay. Thus, in some systems, the UE may not be able to accurately perform timing measurements due to a variation in group delay. As one example, the UE may detect a part-specific delay while performing measurements associated with the first positioning reference signal. Additionally or alternatively, the UE may be pre-configured (such as, via a manufacturer) to experience a part-specific delay while performing measurements associated with the first positioning reference signal. Other sources of variation in group delay may be frequency-specific, path-specific, temperature-specific, or any combination thereof. Thus, improved accuracy in performing one or more timing measurements may be desired.

Figure 2:
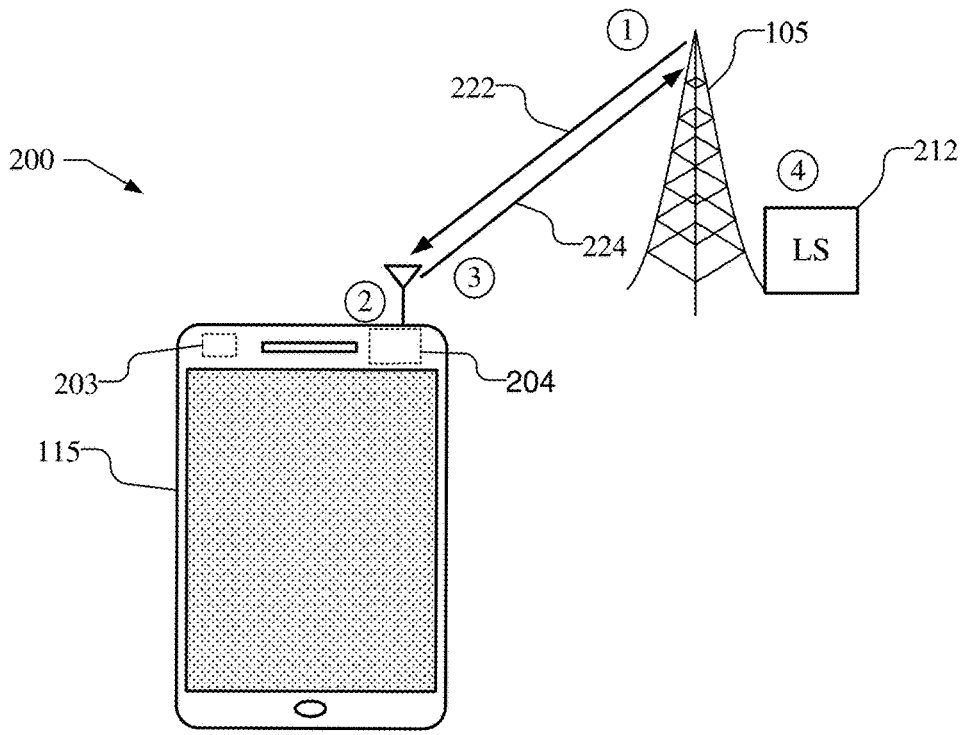
FIG. 2 illustrates a simplified environment and an exemplary technique for determining Round Trip Time (RTT) between a user equipment and a base station.

FIG. 2 illustrates a simplified environment 200 and an exemplary technique for determining Round Trip Time (RTT) between a UE 115 and a base station 105. The UE 115 may communicate wirelessly with a base station, 105 using radio frequency (RF) signals and standardized protocols for the modulation of the RF signals and the exchanging of information packets. By extracting different types of information from the exchanged signals, and utilizing the layout of the network (i.e., the network geometry including additional base stations (not shown)), the position of the UE 115 may be determined in a predefined reference coordinate system. For example, the determined RTT between the UE 115 and the base station 105 is proportional to the distance between the two communication endpoints. Using a known position of the base station 105, the position of the UE 115 may be determined to be on a circle (or sphere) around the base station 105. With similar measurements to multiple base stations having known positions, the position of the UE 115 may be determined based on the point of intersection of the circles (or spheres), e.g., trilateration.

As illustrated, at a stage 1 of determining the RTT between the UE 115 and the base station 105, the base station 105 may transmit an RTT measurement signal (or message) 222 to the UE 115. At stage 2, a processor 203 in the UE 115 receives the RTT measurement signal 222 and processes the signal to determine that a response message is to be returned. At stage 3, the UE 115 transmits a RTT response signal (or message) 224 to the base station 105. The total time between transmitting the RTT measurement signal 222 and receiving the RTT response signal 224 is the measured round trip time, i.e., the RTT measurement. At stage 4, a location server 212, which may be co-located with the base station 105 (e.g., in the RAN) or in the core network 130 shown in FIG. 1, may receive the RTT measurement based on the time between transmitting the RTT measurement signal 222 and receiving the RTT response signal 224 from the base station 105 and may use the RTT measurement to determine an estimated distance between the UE 115 and the base station 105. The location server 212 may use similar RTT measurements for the UE 115 from a number of base stations to then determine an estimated position of the UE using known geometric techniques, such as trilateration.

The UE 115 may comprise and/or be referred to as a device, a mobile device, a wireless device, a mobile terminal, a terminal, a mobile station (MS), a Secure User Plane Location (SUPL) Enabled Terminal (SET), or by some other name. Moreover, UE 115 may correspond to a cellphone, smartphone, laptop, tablet, PDA, tracking device, navigation device, Internet of Things (IoT) device, or some other portable or moveable device. Typically, though not necessarily, the UE 115 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. The UE 115 may also support wireless communication using a Wireless Local Area Network (WLAN) which may connect to other networks (e.g. the Internet) using a Digital Subscriber Line (DSL) or packet cable for example. The use of one or more of these RATs may allow the UE 115 to communicate with an external client and/or allow the external client to receive location information regarding the UE 115.

An estimate of a location of the UE 115 may be referred to as a location, location estimate, location fix, fix, position, position estimate or position fix, and may be geographic, thus providing location coordinates for the UE 115 (e.g., latitude and longitude) which may or may not include an altitude component (e.g., height above sea level, height above or depth below ground level, floor level or basement level). Alternatively, a location of the UE 115 may be expressed as a civic location (e.g., as a postal address or the designation of some point or small area in a building such as a particular room or floor). A location of the UE 115 may also be expressed as an area or volume (defined either geographically or in civic form) within which the UE 115 is expected to be located with some probability or confidence level (e.g., 67%, 95%, etc.) A location of the UE 115 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

The base station 105 may be part of a Fifth Generation (5G) network comprising a Next Generation (NG) Radio Access Network (RAN) (NG-RAN) and a 5G Core Network (5GC). A 5G network may also be referred to as a New Radio (NR) network; NG-RAN may be referred to as a 5G RAN or as an NR RAN; and 5GC may be referred to as an NG Core network (NGC). Standardization of an NG-RAN and 5GC is ongoing in the Third Generation Partnership Project (3GPP). The base station 105 may be referred to as a NR NodeB, also referred to as a gNB. The base station 105 may be part of other types of networks, such as 3G, Long Term Evolution (LTE), etc., and may be referred to as a Node B, evolved NodeB, eNodeB, etc.

During the RTT measurement process, various hardware elements within the UE 115 are necessary to receive and transmit signals for the RTT measurement. For example, a front end structure 204 may be connected to the antenna (or multiple antennas in an antenna array) and may include, e.g., a modem, transceiver, and radio frequency front end (RFFE) module, which may include, e.g., amplifiers, a switching network and bandpass filters. A transmission and reception group delay may occur in the front end structure 204 due to signal propagation times, e.g., between the modem and the antenna that is not included in the measured reception and transmission times.

It should be understood that while FIG. 2 provides one general illustrative process for an RTT measurement, RTT measurements may be produced using other similar processes that are well understood in the art. For example, the base station 105 itself may determine the estimated distance to the UE 115 using the RTT measurement and may provide the estimated distance to the location server 212 as opposed to the RTT measurement. Further, the UE 115, as opposed to the base station 105, may determine the RTT measurement, e.g., the UE 115 would transmit the RTT measurement signal 222 at stage 1 and receive the RTT response signal 224 from the base station 105 at stag 3. The UE 115 may determine the estimated distance between the UE 115 and the base station 105 using the RTT measurement and may determine the estimated position of the UE 115. Alternatively, the UE 115 may communicate with location server 212 and location server may determine estimated distance and/or estimated position of the UE 115.

Determining the distance between the UE 115 and a base station 105 involves exploiting time information of the radio frequency (RF) signals between the two. For example, assuming there is no delay at stage 3, i.e., no delay between receiving the RTT measurement signal 222 at stage 1 and transmitting the RTT response signal 224, the total time between sending the signal and receiving the acknowledgement is related to the time of travel of the signals and, assuming the signals are line of sight (LOS), can be easily converted to the distance between the entities by multiplying by the signal speed, i.e., the speed of light. In practice, however, processing delays exist in both the UE 115 and the base station 105, which affect the RTT measurement. Through calibration, the processing delay may be determined and removed from the RTT measurement in order to more accurately estimate the position of the UE.

Figure 3:
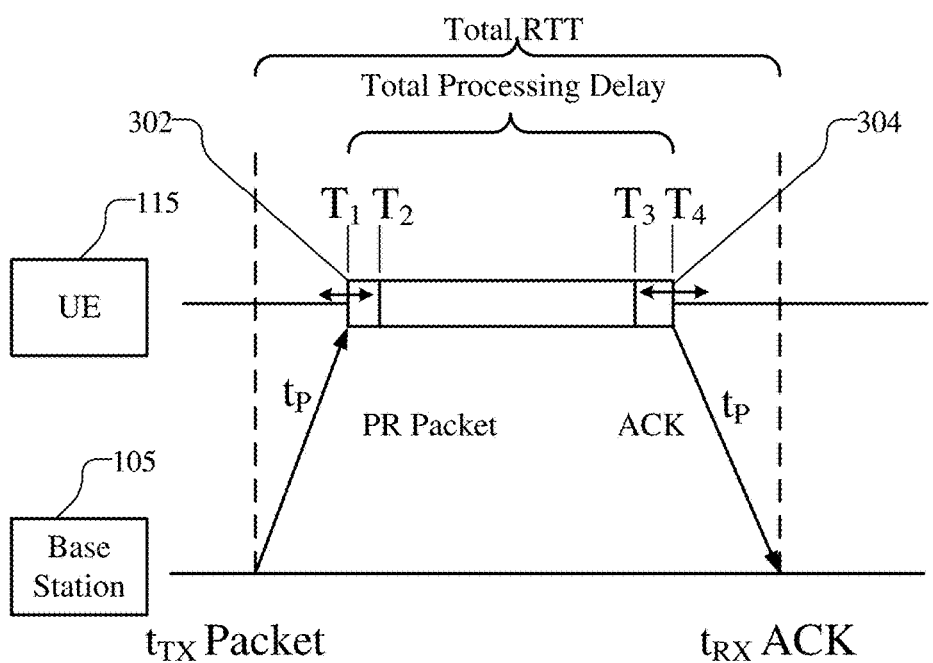
FIG. 3 is a diagram showing exemplary timings within an RTT measurement occurring during a wireless probe request and a response initiated by a first entity and received by a second entity.

FIG. 3 is a diagram showing exemplary timings within an RTT measurement that occur during a wireless probe request and a response initiated by a base station 105 and received by a UE 115. If desired, the wireless probe request and a response initiated by the UE 115 and received by the base station 105. In an aspect, the RTT response may take the form of an acknowledgement packet (ACK); however, any type of response packet may be used.

As illustrated, to measure the RTT with respect to the UE 115, the base station 105 may send a directed probe request, e.g., a downlink RTT reference signal, to the UE 115, and record the time (timestamp) the probe request packet was sent ($t_{TX}$ Packet) as shown on the base station 105 timeline. After a propagation time $t_P$ from the base station 105 to the UE 115, the UE 115 will receive the packet. The UE 115 may then process the directed probe request and may send an acknowledgement (ACK), e.g., an uplink RTT reference signal, back to the base station 105 after some processing time, e.g., the total processing delay, as shown on the UE 115 timeline. After a second propagation time $t_p$, the base station 105 may record the time (timestamp) the ACK packet was received ($t_{RX}$ ACK) as shown on the base station 105 time line. It should be understood that there may also be some processing delay in the base station 105 between receiving the ACK packet and timestamping the ACK packet. The base station 105, or other entity such as the UE 115 or location server, may determine the total RTT as the time difference $t_{RX}$ACK-$t_{TX}$Packet. The net RTT, i.e., the two-way propagation time (2*$t_p$), may be determined based on the difference between the total RTT and the processing delay. Thus, it is important to accurately calibrate the processing delay.

As illustrated in FIG. 3, the processing delay includes a reception delay 302 and a transmission delay 304 caused by hardware (HW) within the UE 115. For example, the $t_{TX}$Packet may be received at the antenna of the UE 115 at time $T_1$, but due to group delays, the UE 115 will not measure the time of arrival until time $T_2$. Similarly, the UE 115 may measure the time of transmission of the $t_{RX}$ACK as time $T_3$, but due to group delays, the $t_{RX}$ACK signal may be emitted by the antenna of the UE 115 at time $T_4$. Accordingly, while the total processing delay is $T_4$-$T_1$, the processing delay detected by the UE 115 is based on the measured time of arrival and time of transmission at the modem, i.e., $T_3$-$T_2$. Moreover, as illustrated by the arrows, these reception and transmission delays 302, 304 may be variable. For example, the processing delay that a UE may experience is the group delay which may include a part-specific delay, a frequency-specific delay, a path-specific delay, a temperature-specific delay, or any combination thereof. It should be understood that if the UE 115 initiates the probe request and a response, the same group delays will be present. The base station 105 may similarly suffer from processing delays caused by hardware.

Thus, to correct for the group delay in the received and transmitted signals, the UE 115 may increase the measured processing delay by the group delay (once known). For example, if the UE 115 measures the processing delay based on the time of reception $T_2$ to the time or transmission $T_3$ at the modem ($T_3$-$T_2$), the total processing delay may be determined by increasing the measured processing delay by the group delay, which is equivalent to the time for the received signal to propagate from the antenna to the modem ($T_2$-$T_1$) and the time for the transmitted signal to propagate from the modem to the antenna ($T_3$-$T_4$).

Currently, position estimation based on round trip time is coarse enough that any variation in hardware delays is considered negligible. However, if more accurate position estimation is desired, e.g., as is being considered under 5G mobile standards based on wideband waveforms at mmWave carrier frequencies such as FR2, FR4, etc., then the variation in hardware delays, e.g., in both the UE 115 and the base station 105, is no longer negligible and must be properly calibrated or controlled. For example, the position estimation requirements currently being considered under the 5G Rel 17 3GPP standard leads to a hardware calibration procedure that estimates electrical delays below 1 nsec.

One option for group delay calibration is to apply no calibration data and to use the mobile device, e.g., perform RTT measurements, without accounting for the reception and transmission delays. This option has low complexity, but also has low performance, i.e., decreased accuracy of the measurements. In environments where high accuracy is not a consideration or, for example, where power savings or other considerations are more important than accuracy, it may be appropriate to use no group delay calibration data.

Another option is to characterize the group delay. The characterization of the group delay, for example, may be based on a factory characterization for all devices of the same design. The characterization may be stored, e.g., in a generalized table (look-up table) or equations that are applicable for devices of the same design. The use of characterization for the group delay is more accurate than the first option, but ignores device to device difference as well as environmental differences, e.g., changes in temperature, which may affect group delay. The use of characterization, thus, provides improved performance, compared to the first option and does not require calibration measurements to be performed before or during the RTT position location process, so no additional power is consumed.

Another option is to perform a closed loop calibration of the group delay in the mobile device. The closed loop calibration may be a conducted closed loop, e.g., a closed loop within the front end of the mobile device, or may be a near field radiated closed loop, e.g., between one or more pairs of antennas of the mobile device. The closed loop calibration offers high accuracy that is device specific and accounts for environmental conditions, such as process-voltage-temperature (PVT) variances. The closed loop calibration, however, requires time and power to perform the calibration. Closed loop calibration, for example, may use a synchronous clocking process, where the analog to digital converter ADC) and digital to analog converter (DAC) use the same frequency or harmonically (integer) related frequencies so that there is a repeatable delay characteristic in both the Rx and Tx paths.

The closed loop group delay calibration may be a conducted feedback method, similar to a feedback receiver (FBRx) or a near field radiated feedback method from Tx to Rx paths. Whether the calibration is conducted or near field radiated, a baseband group delay calibration, such as correlation peak analysis and phase ramp slope analysis, may also be used to compute and determine the closed loop group delay calibration data values.

With a closed loop group delay calibration method, a signal is sent from the radio frequency (RF) transceiver to the radio frequency front end (RFFE) for the conducted approach, or over one or more pairs of antennas for the near field radiated approach. In both cases, a signal can be detected by measuring the RF signal at those locations.

Figure 4:
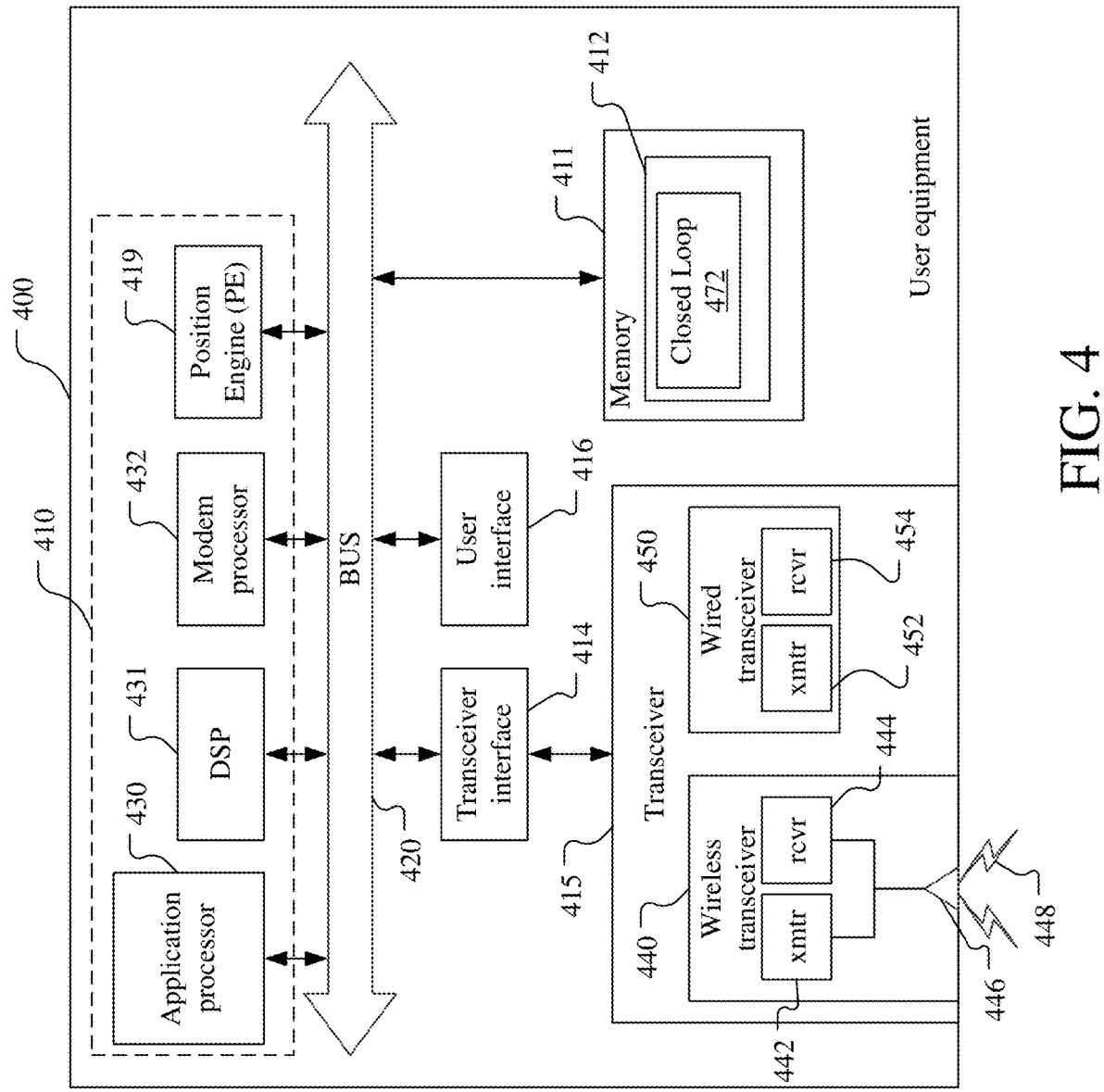
FIG. 4 illustrates a user equipment (UE) that may be configured to perform group delay calibration.

FIG. 4 illustrates a UE 400, which is an example of the UE 115 and comprises a computing platform including a processor 410, memory 411 including software (SW) 412, a transceiver interface 414 for a transceiver 415, and a user interface 416. The processor 410, the memory 411, the transceiver interface 414, the user interface 416 may be communicatively coupled to each other by a bus 420 (which may be configured, e.g., for optical and/or electrical communication). One or more of the shown apparatus may be omitted from the UE 400, moreover one or more additional elements may be added, such as a camera, SPS receiver, etc. The processor 410 may include one or more intelligent hardware devices, e.g., a central processing unit (CPU), a microcontroller, an application specific integrated circuit (ASIC), etc. The processor 410 may comprise multiple processors including an application processor 430, a Digital Signal Processor (DSP) 431, a modem processor 432, and position engine (PE) 433. One or more of the processors 430-432 may comprise multiple devices (e.g., multiple processors). The modem processor 432 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 400 for connectivity. The memory 411 is a non-transitory storage medium that may include random access memory (RAM), flash memory, disc memory, and/or read-only memory (ROM), etc. The memory 411 stores the software 412 which may be processor-readable, processor-executable software code containing instructions that are configured to, when executed, cause the processor 410 to operate as a special purpose computer programmed to perform the various functions described herein. Alternatively, the software 412 may not be directly executable by the processor 410 but may be configured to cause the processor 410, e.g., when compiled and executed, to operate as a special purpose computer to perform the various functions described herein. The description may refer only to the processor 410 performing a function, but this includes other implementations such as where the processor 410 executes software and/or firmware. The description may refer to the processor 410 performing a function as shorthand for one or more of the processors 430-433 performing the function. The description may refer to the UE 400 performing a function as shorthand for one or more appropriate components of the UE 400 performing the function. The processor 410 may include a memory with stored instructions in addition to and/or instead of the memory 411. Functionality of the processor 410 is discussed more fully below.

The configuration of the UE 400 shown in FIG. 4 is an example and not limiting of the invention, including the claims, and other configurations may be used. For example, an example configuration of the UE includes one or more of the processors 430-433 of the processor 410, the memory 411, and the wireless transceiver 440. Other example configurations include one or more of the processors 430-433 of the processor 410, the memory 411, the wireless transceiver 440, the user interface 416, and/or the wired transceiver 450.

The UE 400 may comprise the modem processor 432 that may be capable of performing baseband processing of signals received and down-converted by the transceiver 415. The modem processor 432 may perform baseband processing of signals to be upconverted for transmission by the transceiver 415. Also or alternatively, baseband processing may be performed by the processor 430 and/or the DSP 431. Other configurations, however, may be used to perform baseband processing.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels and/or one or more sidelink channels) and/or receiving (e.g., on one or more downlink channels and/or one or more sidelink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 450 may include a transmitter 452 and a receiver 454 configured for wired communication, e.g., with the network 130. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication. The transceiver 415 may be communicatively coupled to the transceiver interface 414, e.g., by optical and/or electrical connection. The transceiver interface 414 may be at least partially integrated with the transceiver 415.

The user interface 416 may comprise one or more of several devices such as, for example, a speaker, microphone, display device, vibration device, keyboard, touch screen, etc. The user interface 416 may include more than one of any of these devices. The user interface 416 may be configured to enable a user to interact with one or more applications hosted by the UE 400. For example, the user interface 416 may store indications of analog and/or digital signals in the memory 411 to be processed by DSP 431 and/or the processor 430 in response to action from a user. Similarly, applications hosted on the UE 400 may store indications of analog and/or digital signals in the memory 411 to present an output signal to a user. The user interface 416 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 416 may comprise one or more touch sensors responsive to touching and/or pressure, e.g., on a keyboard and/or touch screen of the user interface 416.

The position engine (PE) 433 is illustrates one of the multiple processors in the processor 410, but may be a separate component. The position engine 433 may be configured to determine a position of the UE 400, motion of the UE 400, and/or relative position of the UE 400, and/or time. For example, the PE 433 may work in conjunction with the processor 410 and the memory 411 as appropriate to perform at least a portion of one or more positioning methods, although the description herein may refer only to the PE 433 being configured to perform, or performing, in accordance with the positioning method(s). The PE 433 may be configured to determine location of the UE 400 using terrestrial-based signals (e.g., at least some of the signals 448) for trilateration, for assistance with obtaining and using the SPS signals, or both. The PE 433 may be configured to use one or more other techniques (e.g., relying on the UE's self-reported location (e.g., part of the UE's position beacon)) for determining the location of the UE 400, and may use a combination of techniques (e.g., SPS and terrestrial positioning signals) to determine the location of the UE 400. The PE 433 may be configured to provide indications of uncertainty and/or error in the determined position and/or motion.

The memory 411 may store software 412 that contains executable program code or software instructions that when executed by the processor 410 may cause the processor 410 to operate as a special purpose computer programmed to perform the functions disclosed herein. As illustrated, the memory 411 may include one or more components or modules that may be implemented by the processor 410 to perform the disclosed functions. While the components or modules are illustrated as software 412 in memory 411 that is executable by the processor 410, it should be understood that the components or modules may be stored in another computer readable medium or may be dedicated hardware either in the processor 410 or off the processor. A number of software modules and data tables may reside in the memory 411 and be utilized by the processor 410 in order to manage both communications and the functionality described herein. It should be appreciated that the organization of the contents of the memory 411 as shown is merely exemplary, and as such the functionality of the modules and/or data structures may be combined, separated, and/or be structured in different ways depending upon the implementation.

The memory 411, for example, may include a closed loop module 472 that when implemented by one or more processors 410 configures the one or more processors 410 to measure closed loop group delay calibration data and to determine the group delay as discussed herein. By way of example, the modem processor 432 may be configured to perform the closed loop group delay calibration as discussed herein. In another implementation, the application processor 430 may be configured to initiate or perform the closed loop group delay calibration as discussed herein. The application processor 430 for example may use an Application Programming Interface (API) to initiate the closed loop group delay calibration, e.g., in the modem processor 432, e.g., as a trigger under the Operating System (OS) stack, part of the OS, or by an application above the OS. In some implementations, a master controller (such as a location server), which may be external to the UE 400, may be used to instruct the device to perform recalibration of the closed loop group delay, e.g., if there is or is likely to be a problem based on the reported position or the reported positioning measurements from the UE 400. Use of a master controller may be particularly advantageous, but is not limited to, Industrial Internet of Things (HOT) type applications. The one or more processors 410 may cause switches to produce a closed loop for conducted closed loop calibration measurements. The one or more processors 410 may be configured to monitor the time of transmission and time of arrival of a waveform signal transmitted in a closed loop to determine the group delay. The one or more processors 410 may be further configured to include in the group delay appropriate pre-characterized calibration data, e.g., in components between the closed loop and the antennas in a conduced closed loop process, or the delay due to the distance between antennas in a radiated closed loop process.

Figure 5:
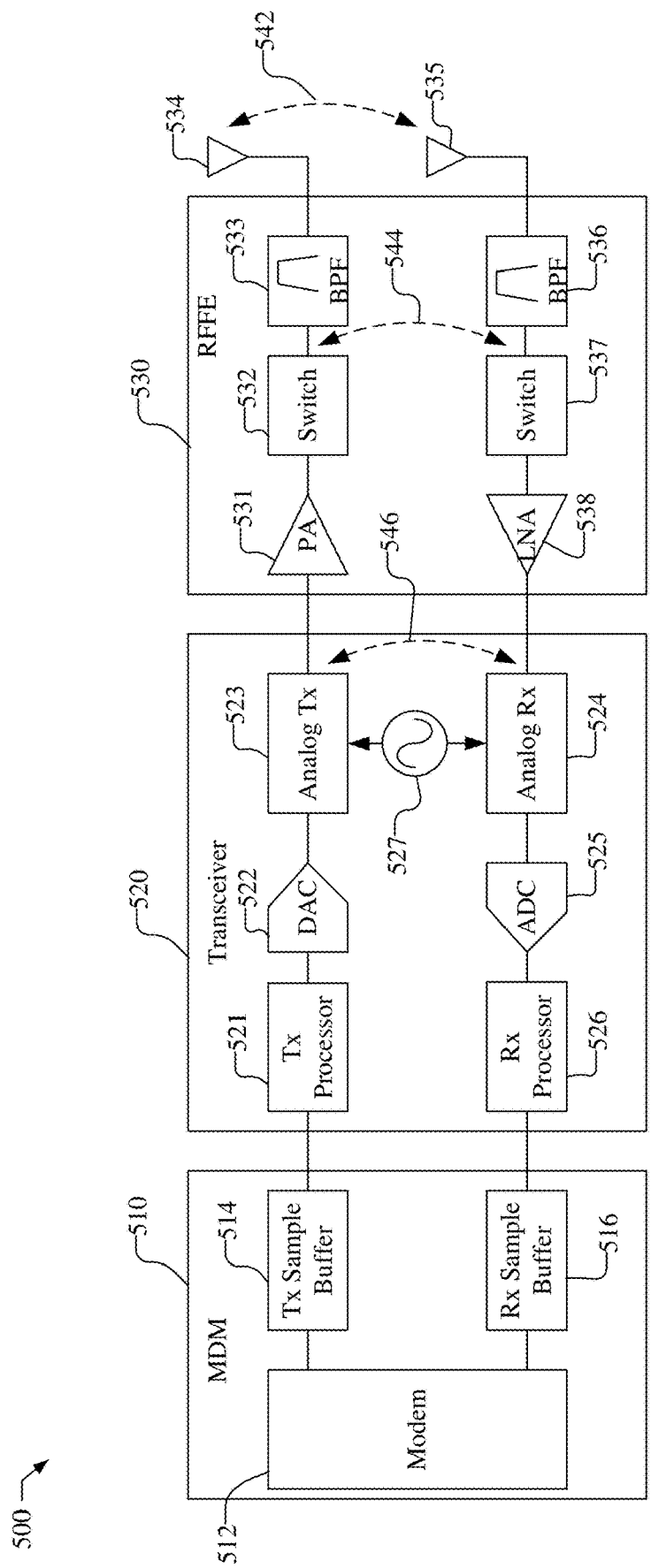
FIG. 5 illustrates a front end structure of a UE and illustrates examples of closed loop paths that may be used for group delay calibration.

FIG. 5 illustrates a front end structure 500 of a UE, such as UE 115 or UE 400, and illustrates examples of closed loop paths that may be used for group delay calibration. As illustrated, the front end structure 500 may include a mobile data modem (MDM) module 510 that includes a baseband modem 512, a transmit sample buffer 514, and a receive sample buffer 516. The MDM module 510 or modem 512, for example, may include or be coupled to the modem processor 432 shown in FIG. 4. The MDM module 510 is connected to the transceiver module 520, that includes in the transmission path, a transmission digital signal processor 521, a digital to analog converter (DAC) 522, and an analog transmit modulator 523, and in the reception path includes analog receive demodulator 524, an analog to digital converter (ADC) 525, and a receive digital signal processor 526. The transceiver further includes a local oscillator 527 coupled to the modulator 523 and demodulator 524. The transceiver module 520 is connected to the radio frequency front end (RFFE) module 530, which includes in the transmission path, a power amplifier 531, a switch 532, and a bandpass filter 533 coupled to an antenna 534, and in the reception path, an antenna 535, a bandpass filter 536, a switch 537, and a low noise amplifier (LNA) 538. It should be understood that the front end structure 500 is illustrated at high level and that additional components may be included in one or more of the MDM module 510, transceiver module 520, and RFFE module 530, as will be understood by those skilled in the art.

The modem 512 may measure the time of transmission of the transmit signal as the time that the transmit signal is output by the MDM module 510, but transmission of the transmit signal by the antenna 534 is delayed as the transmit signal must propagate the transmission path through the transceiver module 520 and RFFE, module 530, including the transmission digital signal processor 521, DAC 522, modulator 523, power amplifier 531, switch 532, and bandpass filter 533, before being emitted by the antenna 534. Similarly, a signal may be received at antenna 535, but the time of arrival of the received signal at the modem 512 will be delayed as the received signal must propagate the reception path through the RFFE module 530 and the transceiver module 520 including the bandpass filter 536, switch 537, LNA 538, demodulator 524, ADC 525, and receive digital signal processor 526.

In an implementation, the group delay in the front end structure 500 may be measured using closed loop calibration, which may be radiated between antennas 534 and 535 or conducted in a closed loop in the transceiver module 520 or the RFFE module 530. The MDM module 510 or modem 512 may serve as a waveform player, e.g., generating, transmitting and receiving the signal waveform and measuring the group delay based on the transmission and reception times as discussed herein. The measurement of the group delay may be performed, e.g., by modem processor 432 via software, or may be performed with hardware, e.g., within the modem 512. During the closed loop calibration process, a synchronous clock may be used with the DAC 522 and ADC so that the same frequency, or harmonically related frequencies, are used so that there is a repeatable delay characteristic in both the Rx and Tx paths. Additionally, when conducted closed loop calibration is used, knowledge of group delays, e.g., pre-characterization of any components after the closed loop (between the closed loop and the antennas), may be used in the group delay determination. For example, variances introduced from process/ voltage/temp (PVT) for the radio filters 533, 536 (and any other memory/delay elements), clocks and other items may be characterized.

In one implementation, closed loop calibration of the group delay in the front end structure 500 may be performed using a near field radiated closed loop from antenna 534 to antenna 535, illustrated by arrow 542. For example, a signal may be transmitted from the modem 512 along the transmission path, including through the transceiver module 520 and RFFE module 530, including the transmission digital signal processor 521, DAC 522, modulator 523, power amplifier 531, switch 532, and bandpass filter 533, before being emitted by the antenna 534, and is received by the antenna 535 via the near field radiated path 542, and propagate the reception path through the RFFE module 530 and the transceiver module 520 including the bandpass filter 536, switch 537, LNA 538, demodulator 524, ADC 525, and receive digital signal processor 526. The group delay may be determined based on the measured time of transmission and the time of arrival of the signal as measured at the modem 512. Because the radiated signal must travel between antenna 534 and 535, which occurs at the speed of light, in some implementations, the time of propagation between antennas 534 and 535 may be accounted for in determining the group delay, e.g. based on the known physical distance between antennas 534 and 535 divided by the speed of light.

In another implementation, the closed loop calibration of the group delay in the front end structure 500 may be performed using a conducted closed loop. For example, a conducted closed loop may be produced in the RFFE module 530 by coupling the switches 532 and 537 together, as illustrated by arrow 544. A signal may be then be transmitted from the modem 512 along the transmission path, including through the transceiver module 520 and RFFE module 530, including the transmission digital signal processor 521, DAC 522, modulator 523, power amplifier 531, switch 532, along the closed loop conductive path 544, and propagates through the reception path through the RFFE module 530 and the transceiver module 520 including the switch 537, LNA 538, demodulator 524, ADC 525, and receive digital signal processor 526. The group delay may be determined based on the measured time of transmission and the time of arrival of the signal as measured at the modem 512. The conductive path, however, does not include any components between the switch 532 and antenna 534 or between antenna 535 and switch 537, including the bandpass filters 533 and 536. Accordingly, in some implementations, the group delay caused by any components between the switch 532 and antenna 534 and between antenna 535 and switch 537, including the bandpass filters 533 and 536 may be pre-characterized, e.g., based on factory measurements, and included in the group delay calibration.

In another implementation, the closed loop calibration of the group delay in the front end structure 500 may be performed using a conducted closed loop through the transceiver module 520, illustrated by coupling the modulator 523 and the demodulator 524 in the transceiver module 520 together, as illustrated by arrow 546. A signal may be then be transmitted from the modem 512 along the transmission path, including through the transceiver module 520 including the transmission digital signal processor 521, DAC 522, and modulator 523, along the closed loop conductive path 546, and propagates through the reception path through the transceiver module 520 including the demodulator 524, ADC 525, and receive digital signal processor 526. The group delay may be determined based on the measured time of transmission and the time of arrival of the signal as measured at the modem 512. The conductive path, however, does not include any components between the modulator 523 and antenna 534 or between antenna 535 and demodulator 524, e.g., all of the components in the RFFE module 530. Accordingly, in some implementations, the group delay caused by any components between the modulator 523 and antenna 534 and between antenna 535 and demodulator 524, e.g., components in the RFFE module 530, may be pre-characterized, e.g., based on factor measurements, and included in the group delay calibration.

The pre-characterized delays of various components, such as the delay caused the radiated signal traveling between antennas 534 and 535, or through components between the switch 532 and antenna 534 and between antenna 535 and switch 537, including the bandpass filters 533 and 536, or through components between the modulator 523 and antenna 534 and between antenna 535 and demodulator 524, e.g., components in the RFFE module 530, may be stored in memory of the UE, e.g., memory 411 shown in FIG. 4, and used by one or more processors 410 to determine the group delay in the front end structure 500.

In some implementations, during positioning, one or more components, such as filters in the (RFFE) module 530 and/or the transceiver 520 may be bypassed. Accordingly, during the group delay calibration procedure, the same filters may be bypassed so that the transmit path and receive path used during the group delay calibration procedure includes the same components that will be used for positioning. In an instance where a bypassed filter is external to the conducted closed loop (e.g., the filters between the conducted closed loop 544 or 546 and the antennas 534 and 535) the pre-characterization of the delay from the components should exclude propagation delay due to the bypassed components, and optionally, include the propagation delay due to the bypass path.

Figure 6:
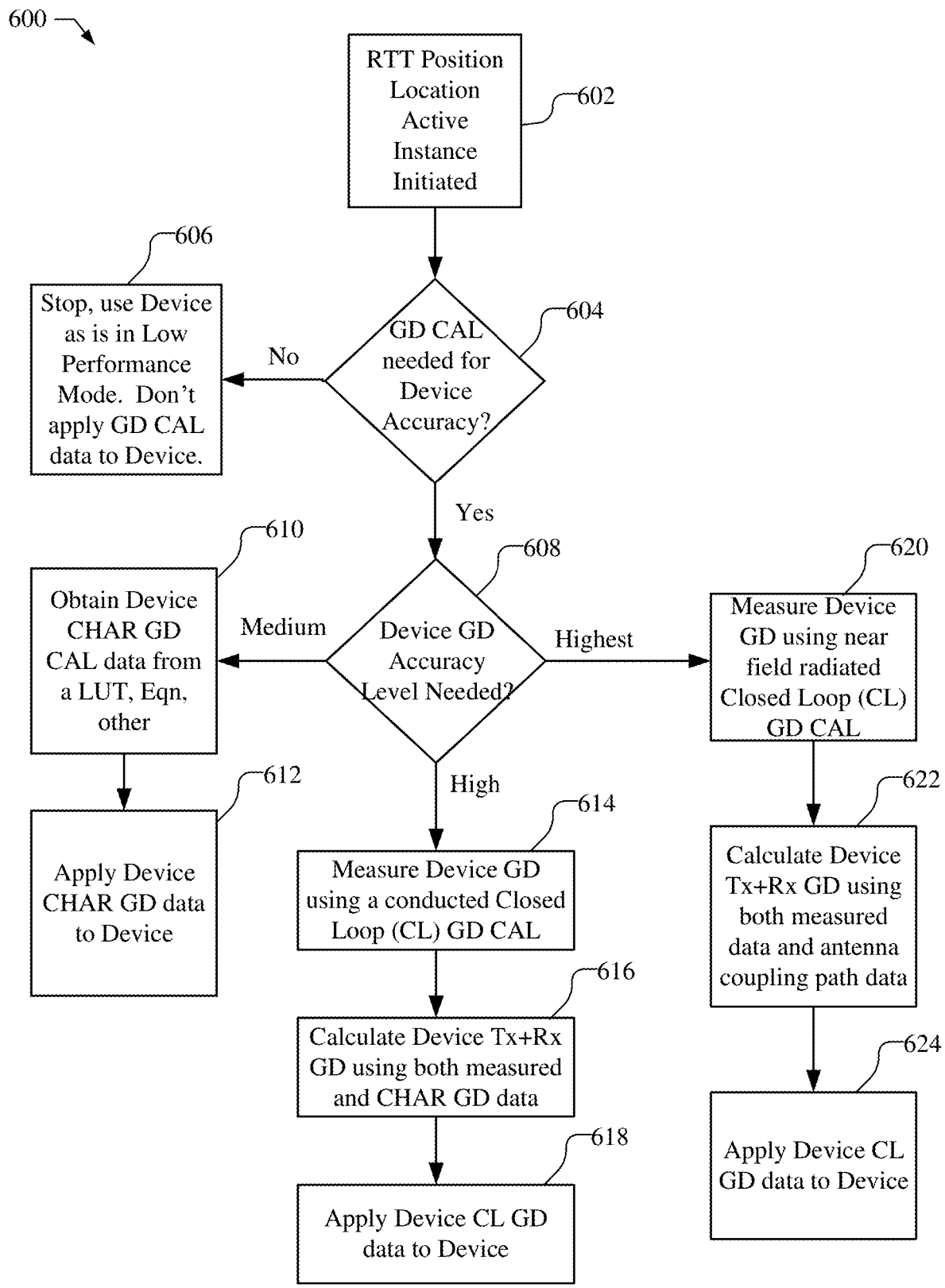
FIG. 6 shows a flow chart illustrating a group delay calibration process for a UE.

FIG. 6 shows a flow chart 600 illustrating a group delay calibration process for a UE 115. While FIG. 6 discusses RTT position location, it should be understood that group delay calibration may be used for other types of position location, such as single sided ranging. As illustrated, at block 602, an RTT position location active instance is initiated. For example, the UE 115 may receive a request for location information from a location server that requests RTT. At block 604, the device determines whether group delay (GD) calibration (CAL) is needed for accurate positioning. For example, in environments or situations where a high degree of position accuracy is not required, group delay calibration may not be necessary and may be an unnecessary drain on power and time. The UE 115, for example, may be provided with accuracy information, such as required quality of service, from a location server or base station, which the UE 115 may compared to a threshold to determine whether group delay calibration is necessary. As illustrated at block 606, if group delay calibration is not necessary for desired accuracy, the UE 115 may perform the RTT position location in a low performance mode without applying a apply group delay calibration.

If, at block 604, it is determined that group delay calibration is necessary, the accuracy level for the group delay calibration is determined at block 608. The UE 115 may determine the accuracy level required for the RTT position location based on, e.g., accuracy information provided by the location server or base station, such as the required quality of service, which may be compared to one or more thresholds. As illustrated in FIG. 6, the accuracy of the group delay calibration may be selected from medium, high, and highest.

If a medium accuracy level is selected at block 610, the UE obtains the characterized (CHAR) group delay calibration data, which may be stored in memory, e.g., in a look up table, or in one or more equations, or other storage mechanisms. The characterized group delay calibration data, for example, may be based on factory measurements of group delay for all devices of the same design. At block 612, the characterized (CHAR) group delay calibration data is applied to the UE 115 for position measurements, such as RTT. During a position measurement in which group delay may be factor, such as RTT measurements, the group delay calibration data may be applied by increasing the measured processing delay by the group delay calibration. The application of the characterized (CHAR) group delay calibration data improves position measurements, e.g., relative to the low performance option (block 606), but because the characterized (CHAR) group delay calibration data is common for all devices of the same design, it does not accurately reflect device specific or environmental specific (e.g., process/voltage/temperature (PVT)) variances of the group delay.

If a higher level of accuracy is desired at block 610, the UE 115 may select to use a closed loop calibration method, as discussed in FIG. 5. For example, at block 614, for a high level of accuracy, the UE may measure the group delay calibration using a conducted closed loop group data calibration process. For example, as illustrated in FIG. 5, closed loop group calibration data may be measured using a conducted closed loop in the transceiver module 520 or in the RFFE module 530, shown in FIG. 5. At block 616, the group delay may be determined by calculating the transmission and receipt times using the measured data, e.g., based on the difference between the time of transmission and the time of arrival. Additionally, because there are additional components between the closed loop and the antennas of the UE, characterized group data for these components may be included in the calculation of the group delay. For example, as illustrated in FIG. 5, the pre-characterized delays through components between the switch 532 and antenna 534 and between antenna 535 and switch 537, including the bandpass filters 533 and 536, or through components between the modulator 523 and antenna 534 and between antenna 535 and demodulator 524, e.g., components in the RFFE module 530, may be stored in memory of the UE, e.g., memory 411 shown in FIG. 4, and used by one or more processors 410 to determine the group delay. At block 618, the closed loop group delay data is applied to the UE 115 for position measurements, such as RTT. For example, during a position measurement in which group delay may be factor, such as RTT measurements, the group delay calibration data may be applied by increasing the measured processing delay by the group delay calibration.

If a higher level of accuracy is desired at block 610, the UE 115 may select to use a closed loop calibration method, as discussed in FIG. 5. For example, at block 614, for a high level of accuracy, the UE may measure the group delay calibration using a conducted closed loop group data calibration process, e.g., by transmitting a signal along a transmission path that is received via a conducted closed loop by the reception path. For example, as illustrated in FIG. 5, closed loop group calibration data may be measured using a conducted closed loops 546 or 544 in the respective transceiver module 520 and in the RFFE module 530, shown in FIG. 5. At block 616, the group delay may be determined by calculating the transmission and receipt times using the measured data, e.g., based on the difference between the time of transmission and the time of arrival as measured at the modem. Additionally, because there are additional components between the closed loop and the antennas of the UE, characterized group data for these components may be included in the calculation of the group delay. For example, as illustrated in FIG. 5, the pre-characterized delays through components between the switch 532 and antenna 534 and between antenna 535 and switch 537, including the bandpass filters 533 and 536, or through components between the modulator 523 and antenna 534 and between antenna 535 and demodulator 524, e.g., components in the RFFE module 530, may be stored in memory of the UE, e.g., memory 411 shown in FIG. 4, and used by one or more processors 410 to determine the group delay. At block 618, the closed loop group delay data is applied to the UE 115 for position measurements, such as RTT. For example, during a position measurement in which group delay may be factor, such as RTT measurements, the group delay calibration data may be applied by increasing the measured processing delay by the group delay calibration.

For the highest level of accuracy, at block 620 the UE may measure the group delay calibration using a near field radiated closed loop group data calibration process, e.g., by transmitting a signal that is emitted by one antenna and received on another antenna and determining at the modem the time of transmission and the time of reception of a signal. For example, as illustrated in FIG. 5, closed loop group calibration data may be measured using a radiated closed loop 542 between antennas 534 and 535, shown in FIG. 5. At block 622, the group delay may be determined by calculating the transmission and receipt times using the measured data, e.g., based on the difference between the time of transmission and the time of arrival at the modem. Additionally, because there is a physical space between antennas, the time of signal propagation between the antennas is included in the difference between the time of transmission and the time of arrival. For example, as illustrated in FIG. 5, the distance between antenna's or the signal propagation time between antennas may be stored in memory of the UE, e.g., memory 411 shown in FIG. 4, and used by one or more processors 410 to determine the group delay by reducing the calculated difference between the time of transmission and the time of arrival by the signal propagation between the antennas. At block 624, the closed loop group delay data is applied to the UE 115 for position measurements, such as RTT. For example, during a position measurement in which group delay may be factor, such as RTT measurements, the group delay calibration data may be applied by increasing the measured processing delay by the group delay calibration.

While FIG. 6 illustrates several options with various accuracy levels, with the UE 115 determining which option to use based on desired accuracy levels, in some implementations, the UE 115 may use a subset of the illustrated options. In some implementations, for example, the UE 115 may simply perform one type of group delay calibration methods, e.g., the conducted group delay calibration or the near field radiated group delay calibration. In some implementations, the UE 115 may select between only the conducted group delay calibration or the near field radiated group delay calibration.

In some implementations, the UE 115 may measure the group delay calibration data after the UE 115 is engaged in a positioning session, e.g., at the beginning of a positioning session. In other implementations, the UE 115 may measure the group delay calibration data before engaging in a positioning session. For example, the UE 115 may measure conducted group delay calibration data and/or near field radiated group delay calibration data periodically, such as once a day, once an hour, etc.

In some implementations, the UE 115 may include more than the two antennas, as illustrated in FIG. 5. Moreover, the front end structure of the UE 115 may include multiple different transmission paths and receptions paths. Moreover, the transmission paths and reception paths may be coincident, i.e., the same antenna may be used for transmission and reception of signals during RTT positioning measurements. Accordingly, it may be desirable to determine the group delay calibration data for a single path, which may be used for both transmission and reception.

Figure 7:
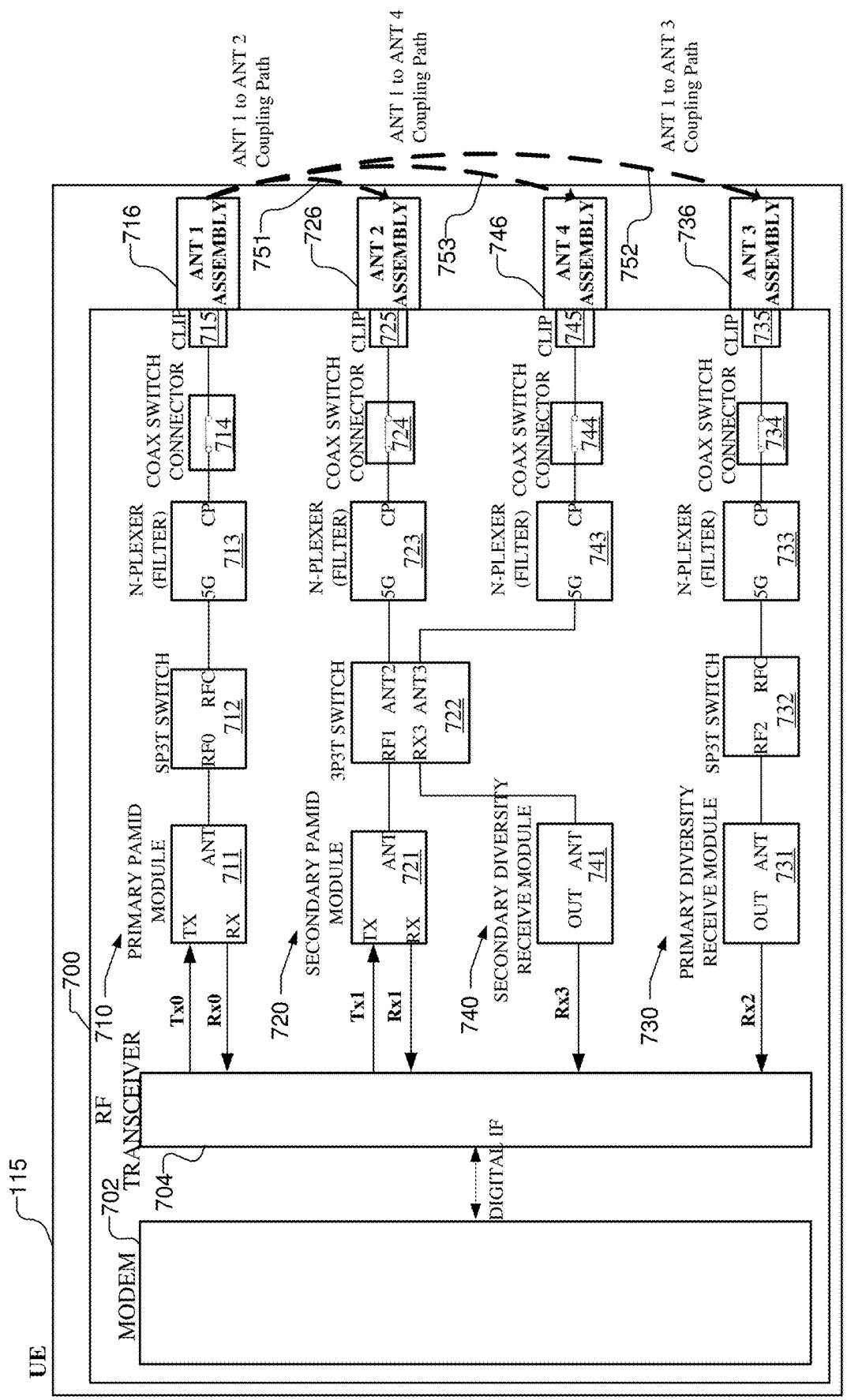
FIGS. 7 and 8 illustrate an example embodiment of a front end structure for a UE and the process of acquiring group delay calibration data using a near field radiated closed loop process with antennas in an antenna array.
Figure 8:
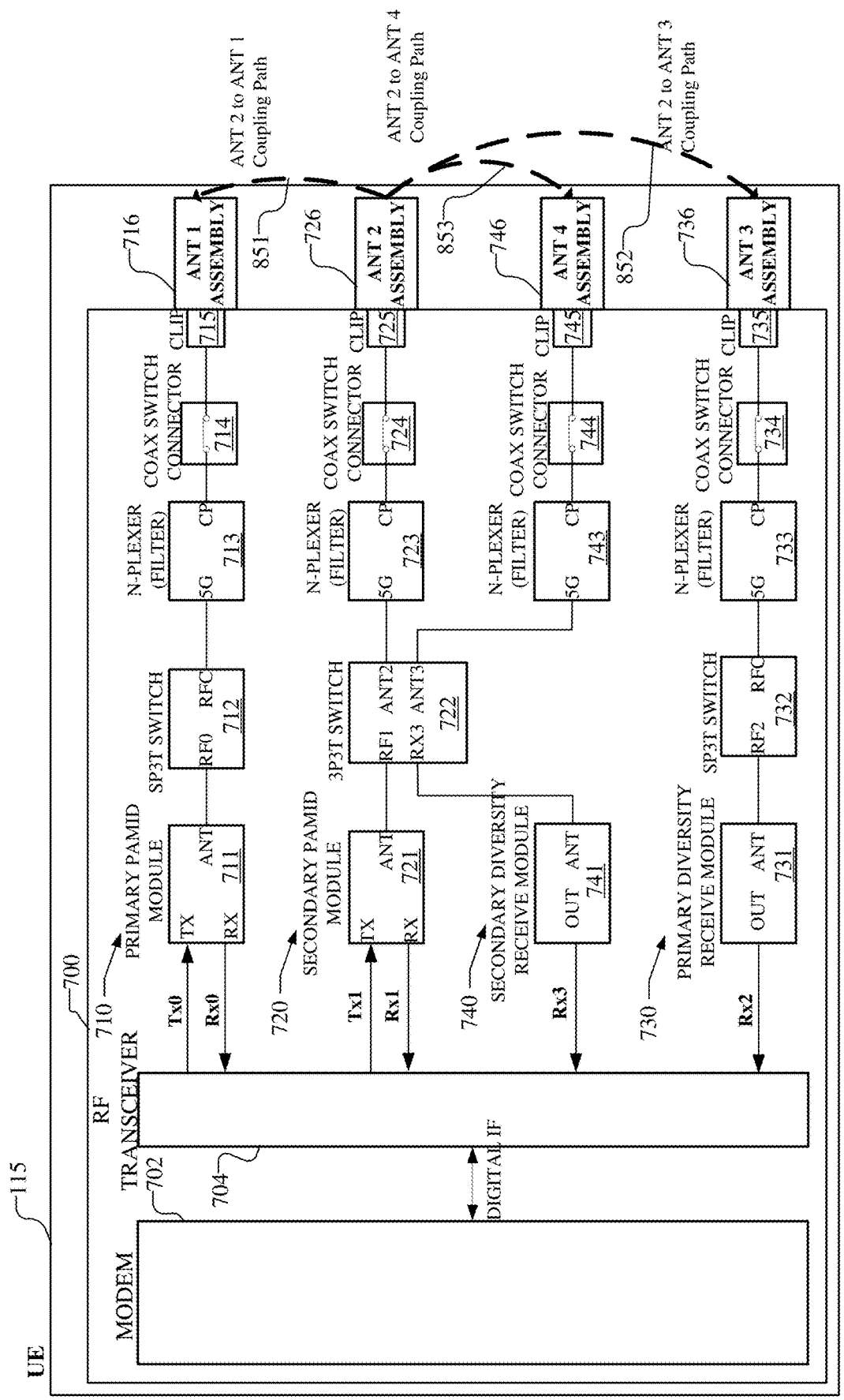

FIGS. 7 and 8 illustrate another example embodiment of a front end structure 700 for a UE 115 multiple transmission and reception paths, and the process of acquiring group delay calibration data using near field radiated closed loop process with antennas in an antenna array. The front end structure 700 shown in FIGS. 7 and 8, for example, is illustrated with a modem 702, transceiver 704, and a number of components between the transceiver 704 and the antenna assemblies 716, 726, 736, and 746. The modem 702, for example, may include the modem processor 432 shown in FIG. 4. The modem 702, for example, serves as the waveform player, e.g., generating, transmitting and receiving the signal waveform used for the closed loop group delay calibration. The modem 702 may measure the group delay based on the transmission and reception times as discussed herein. The measurement of the group delay may be performed, e.g., by modem processor 432 via software, or may be performed with hardware, e.g., within the modem 702.

As illustrated, along a primary path 710, which is coupled to transceiver 704 via transmission path Tx0 and reception path Rx0, the front end structure 700 may include a primary power amplifier module 711, which may include an integrated duplexer, followed by a switch 712, which may be a SP3T switch. A filter 713, e.g., an N-plexer RF filter, is coupled to the switch 712 and is connected to the antenna assembly 716 (ANT1) via a coaxial switch connector 714 and a clip 715.

A secondary path 720 is coupled to the transceiver 704 via transmission path Tx1 and reception path Rx1 and includes a secondary power amplifier module 721, which may include an integrated duplexer, followed by a switch 722, which may be a 3P3T switch. A filter 723, e.g., an N-plexer RF filter, is coupled to the switch 722 and is connected to the antenna assembly 726 (ANT2) via a coaxial switch connector 724 and a clip 725.

A primary receive path 730 is coupled to the transceiver 704 via a reception path Rx2 and includes a low noise amplifier (LNA) 731, labeled a primary diversity receive module, followed by a switch 732, which may be a SP3T switch. A filter 733, e.g., an N-plexer RF filter, is coupled to the switch 732 and is connected to the antenna assembly 736 (ANT3) via a coaxial switch connector 734 and a clip 735.

A secondary receive path 740 is coupled to the transceiver 704 via a reception path Rx3 and includes a low noise amplifier (LNA) 741, labeled a secondary diversity receive module, which is coupled to the switch 722 in the secondary path 720. The switch 722 is further connected to the secondary diversity receive path 740 a filter 743, e.g., an N-plexer RF filter, which is connected to the antenna assembly 746 (ANT4) via a coaxial switch connector 744 and a clip 745.

To generate group data calibration using near field radiated closed loop, transmission via the primary path (Tx0) (shown in FIG. 7) and transmission via the secondary path (Tx1) (shown in FIG. 8) is utilized. The near field radiated procedure may be executed in the field by the UE 115, as opposed to in the factory, with the transmitter power set low so as to not interfere with regular cellular network operation.

In some implementations, during positioning, one or more components, e.g., such as filters, in the front end structure 700 may be bypassed. Accordingly, during the group delay calibration procedure, the same one or more components, e.g., filters, may be bypassed so that the transmit path and receive path used during the group delay calibration procedure includes the same components as will be used for positioning.

The delay within a single path, e.g., within only the primary path 710 or within only the secondary path 720, cannot be directly measured because the primary power amplifier module 711 and the secondary power amplifier module 721 include a transmit/receive switch (T/R switch), and thus, the power amplifier modules 711 and 721 operate in either transmit-only mode or receive-only mode. Accordingly, a number of coupling paths between different antennas pairs may be used to measure delay times, and used to determine the delay within a single path. For example, based on transmission through the primary path 710, as illustrated in FIG. 7, there may be a coupling path 751 between ANT1 and ANT2, a coupling path 752 between ANT1 and ANT3, and a coupling path 753 between ANT1 and ANT4. Further based on transmission through the secondary path 720, as illustrated in FIG. 8, there may be a coupling path 851 between ANT2 and ANT1, a coupling path 852 between ANT2 and ANT3, and a coupling path 853 between ANT2 and ANT4.

The delay time in a coupling path between antennas will necessarily include the time associated with antenna to antenna coupling path. The associated with antenna to antenna coupling path may be determined based on the physical distance between the various antenna pairs in the UE in conjunction with (divided by) the speed of light. The UE 115 for example, may include a look-up table (LUT) providing the time parameters associated with the various coupling paths with the time parameters as illustrated in Table 1.

TABLE 1

| Coupling Path | Time Parameters |
| --- | --- |
| Ant1 to Ant2 | T(751) |
| Ant1 to Ant3 | T(752) |
| Ant1 to Ant4 | T(753) |
| Ant2 to Ant1 | T(851) (Equivalent to T(751)) |
| Ant2 to Ant3 | T(852) |
| Ant2 to Ant4 | T(853) |

Thus, as illustrated by coupling path 751 between ANT1 and ANT2 in FIG. 7, for group delay calibration measurement, a waveform signal is played through the primary path 710 (Tx0 path), and the group delay (e.g., transmission time to reception time at the modem 702) is measured via the secondary path 720 (Rx1 path) closing the loop. This measurement will include the time associated with the ANT1 to ANT2 coupling path 752. Using the near field radiated coupling path LUT, the delay in the transmission path (Tx0) and the reception path (Rx1) for this closed loop may be determined as:

$$T(A) = \text{measured group delay } (Tx0 \rightarrow Rx1) - T(751) = T(Tx0) + T(Rx1) \quad \text{eq. 1}$$

Another waveform signal may be played through the primary path 710 (Tx0 path), and the group delay measured via the primary receive path 730 (Rx2 path) closing the loop. Using the near field radiated coupling path LUT, the delay in the transmission path (Tx0) and the reception path (Rx2) for this closed loop may be determined as:

$$T(B) = \text{measured group delay } (Tx0 \rightarrow Rx2) - T(752) = T(Tx0) + T(Rx2) \quad \text{eq. 2}$$

Another waveform signal may be played through the primary path 710 (Tx0 path), and the group delay measured via the secondary receive path 740 (Rx3 path) closing the loop. Using the near field radiated coupling path LUT, the delay in the transmission path (Tx0) and the reception path (Rx3) for this closed loop may be determined as:

$$T(C) = \text{measured group delay } (Tx0 \rightarrow Rx3) - T(753) = T(Tx0) + T(Rx3) \quad \text{eq. 3}$$

As illustrated in FIG. 8, another waveform signal may be played through the secondary path 720 (Tx1 path), and the group delay measured via the primary path 710 (Rx0 path) closing the loop. Using the near field radiated coupling path LUT, the delay in the transmission path (Tx1) and the reception path (Rx0) for this closed loop may be determined as:

$$T(D) = \text{measured group delay } (Tx1 \rightarrow Rx0) - T(851) = T(Tx1) + T(Rx0) \quad \text{eq. 4}$$

Another waveform signal may be played through the secondary path 720 (Tx1 path), and the group delay measured via the primary receive 730 (Rx2 path) closing the loop. Using the near field radiated coupling path LUT, the delay in the transmission path (Tx1) and the reception path (Rx2) for this closed loop may be determined as:

$$T(E) = \text{measured group delay } (Tx1 \rightarrow Rx2) - T(852) = T(Tx1) + T(Rx2) \quad \text{eq. 5}$$

Another waveform signal may be played the secondary path 720 through (Tx1 path), and the group delay measured via the secondary receive path 740 (Rx3 path) closing the loop. Using the near field radiated coupling path LUT, the delay in the transmission path (Tx1) and the reception path (Rx3) for this closed loop may be determined as:

$$T(F) = \text{measured group delay } (Tx1 \rightarrow Rx3) - T(853) = T(Tx1) + T(Rx3) \quad \text{eq. 6}$$

Based on the measured group delays for the various closed loops, the group delay within the primary path 710 [T(Tx0)+T(Rx0)] may be determined as follows:

$$[T(Tx0) + T(Rx0)] = T(C) - T(F) + T(D). \quad \text{eq. 7a}$$

Equivalently, the group delay within the primary path 710 [T(Tx0)+T(Rx0)] may be determined as follows:

$$[T(Tx0) + T(Rx0)] = T(B) - T(E) + T(D). \quad \text{eq. 7b}$$

Similarly, the group delay within the secondary path 720 [T(Tx1)+T(Rx1)] may be determined as follows:

$$[T(Tx1) + T(Rx1)] = T(A) - T(B) + T(E). \quad \text{eq. 8a}$$

Equivalently, the group delay within the secondary path 720 [T(Tx1)+T(Tx1)] may be determined as follows:

$$[T(Tx1) + T(Rx1)] = T(A) - T(C) + T(F). \quad \text{eq. 8b}$$

It can seen from equations 7a, 7b, 8a, and 8b, that it may be unnecessary to perform six separate closed loop calibration measurements, and that in some implementations, only four calibration measurements are necessary, e.g., to obtain T(A), T(C), T(D), and T(F) or to obtain T(A), T(B), T(D), and T(E), with which the group delays in both the primary path and the secondary path may be determined.

Figure 9:
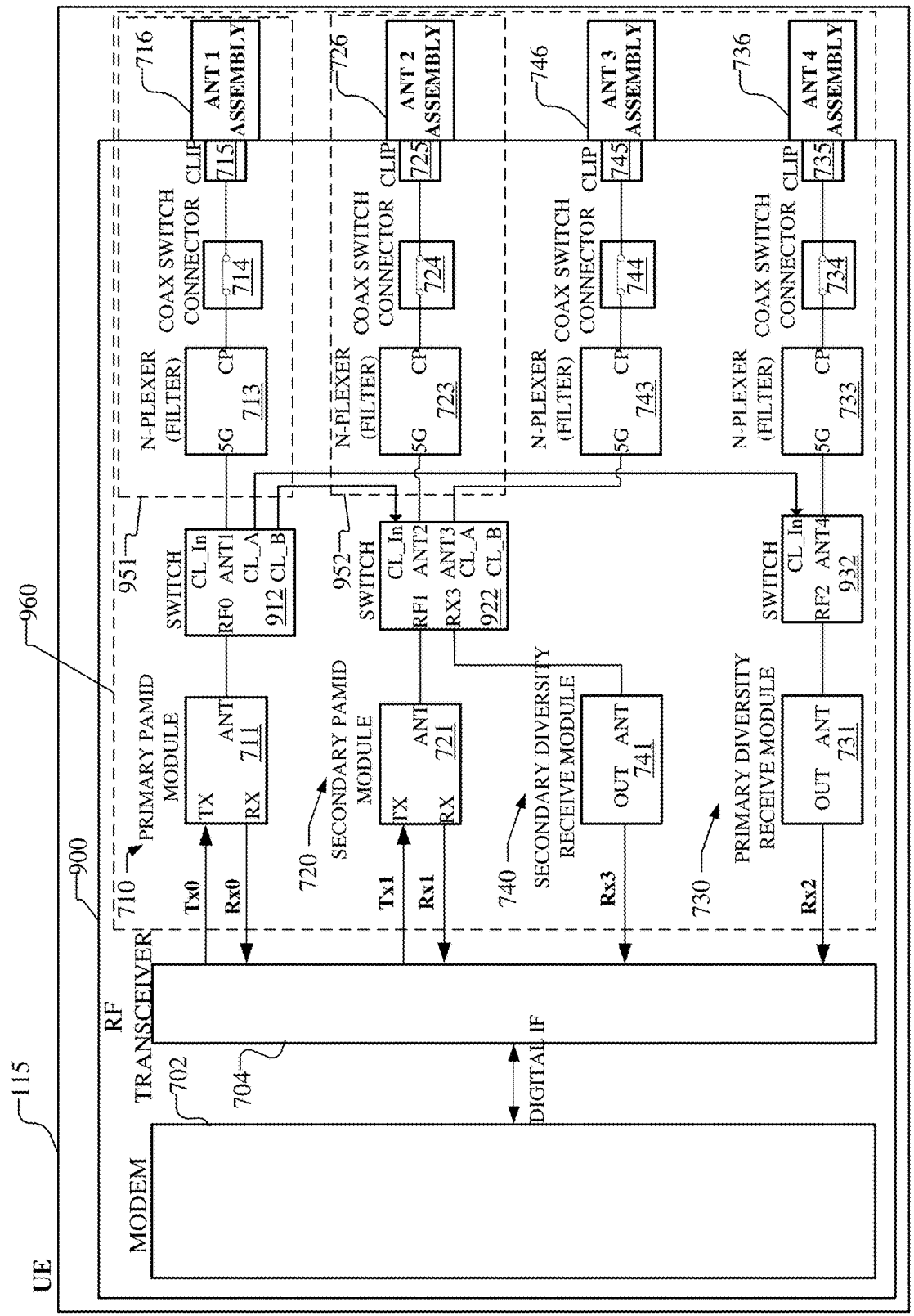
FIGS. 9 and 10 illustrate an example embodiment of a front end structure for a UE and the process of acquiring group delay calibration data using a conducted closed loop process.
Figure 10:
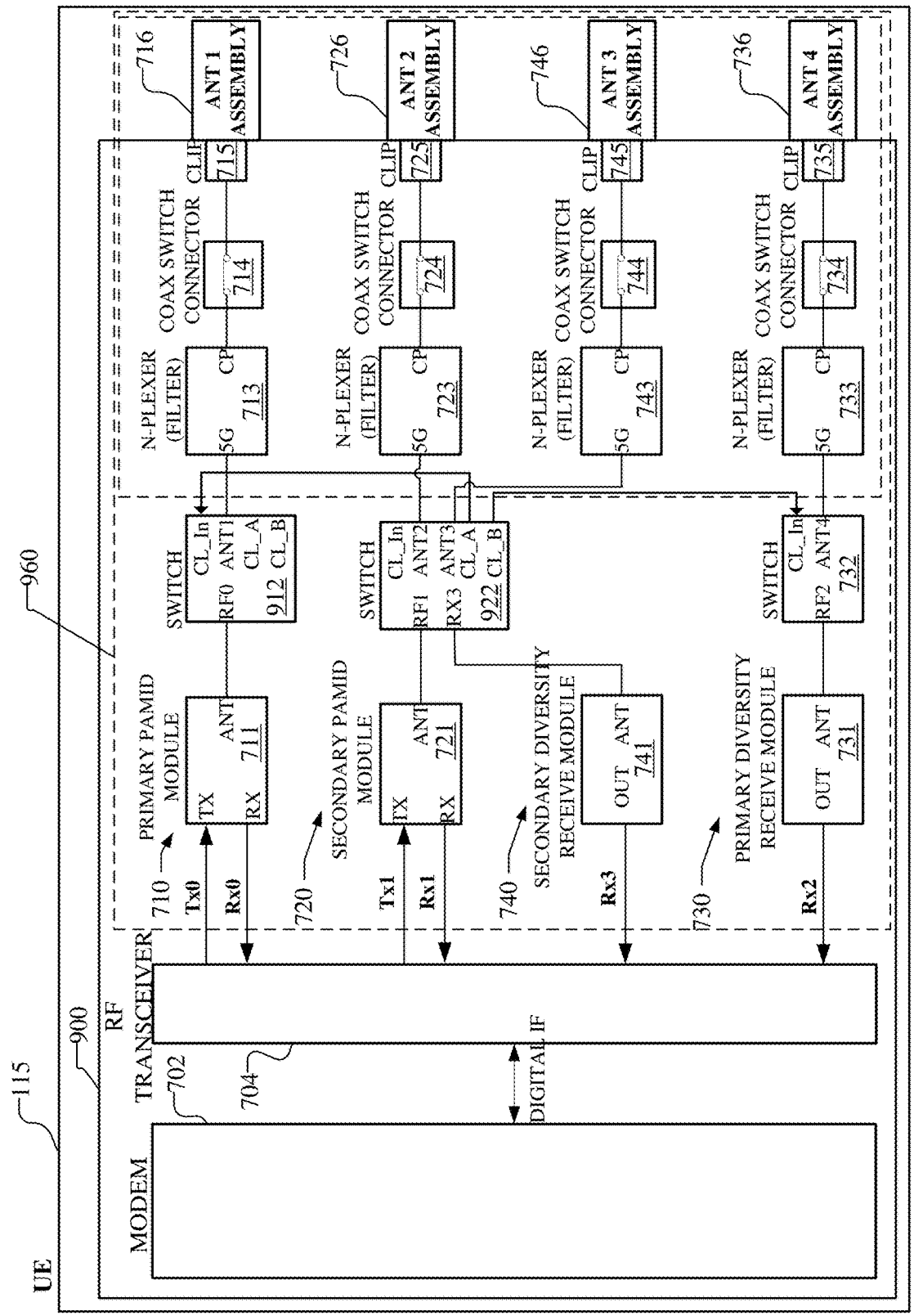

FIGS. 9 and 10 illustrate another example embodiment of a front end structure 900 for a UE 115 multiple transmission and reception paths, and the process of acquiring group delay calibration data using a conducted closed loop process. The front end structure 900 shown in FIGS. 9 and 10 is similar to the front end structure 700 shown in FIGS. 7 and 8, like designated elements being the same. With conducted closed loop process, the transmission and reception group delay within a single path may be measured with the UE configured in conducted loopback modes to couple a given transmission path to a given reception path. Thus, in one implementation in which the conducted closed loop process occurs after the transceiver 704, as illustrated in FIGS. 9 and 10, the switch 912 in the primary path 710, the switch 922 in the secondary path 720, and the switch 932 in the primary receive path 730 may include additional routing options relative to switches 712, 722, and 732 shown in FIG. 7. Similar to the front end structure 700, with the conducted closed loop process illustrated in FIGS. 9 and 10, the modem 702, for example, serves as the waveform player, e.g., generating, transmitting and receiving the signal waveform used for the closed loop group delay calibration. The modem 702 may measure the group delay based on the transmission and reception times as discussed herein. The measurement of the group delay may be performed, e.g., by modem processor 432 via software, or may be performed with hardware, e.g., within the modem 702.

FIGS. 9 and 10 illustrate the conducted closed loop process within the RF switch network domain. The routing options of the RF switch network may be expanded to support the necessary coupling of Tx and Rx paths. For example, the switch 912 in the primary path 710 may include an additional closed loop (CL) input (CL_In), and a number of additional outputs (CL_A and CL_B). Similarly, switch 922 in the secondary path 720 also includes an additional input (CL_In) and a number of additional outputs (CL_A and CL_B). Switch 932 in the primary receive path 730 may include an additional input (CL_In).

As illustrated in FIG. 9, when the transmission of the waveform signal is along the primary path 710 (Tx0 path), the switch 912 may couple the waveform signal from an output (CL_B) to an input (CL_In) of switch 922, and may separately couple an output (CL_A) to an input (CL_In) of switch 932. Moreover, as illustrated in FIG. 10, when the transmission of the waveform signal is along the primary path 710 (Tx1 path), the switch 922 may couple the waveform signal from an output (CL_A) to an input (CL_In) of switch 912, and may separately couple an output (CL_B) to an input (CL_In) of switch 932. As illustrated by boxes 951 and 952, the conducted closed loop within the RF switch network domain does not provide coverage for components between the switches 912 and 922 and the antennas 716 and 726, respectively, including the RF filters 713 and 723. The delay for components in boxes 951 and 952 may be pre-characterized and stored in UE 115.

In some implementations, during positioning, one or more components, such as filters, may be bypassed. Accordingly, during the group delay calibration procedure, the same one or more components, e.g., filters, may be bypassed so that the transmit path and receive path used during the group delay calibration procedure includes the same components as will be used for positioning. In an instance where a bypassed filter is external to the conducted closed loop (e.g., the filters are in boxes 951 and/or 952), the pre-characterization of the delay from the components should exclude propagation delay due to the bypassed filters, and optionally, include the propagation delay due to the bypass path.

As illustrated in FIG. 9, with the use of conducted closed loop within the RF switch network domain, group delay measurements may be performed for different combinations of transmission path and reception path. For example, a waveform signal may be played through the primary path 710 (Tx0 path), and the group delay (e.g., transmission time to reception time at the modem 702) may be measured via the secondary path 720 (Rx1 path) closing the loop.

$$T(W)=\text{measured group delay }(Tx0 \to Rx1)=T(Tx0)+T(Rx1) \quad \text{eq. 9}$$

Another waveform signal may be played through the primary path 710 (Tx0 path), and the group delay measured via the primary receive path 730 (Rx2 path) closing the loop. The delay in the transmission path (Tx0) and the reception path (Rx2) for this closed loop may be determined as:

$$T(X)=\text{measured group delay }(Tx0 \to Rx2)=T(Tx0)+T(Rx2) \quad \text{eq. 10}$$

As illustrated in FIG. 10, another waveform signal may be played through the secondary path 720 (Tx1 path), and the group delay measured via the primary path 710 (Rx0 path) closing the loop. The delay in the transmission path (Tx1) and the reception path (Rx0) for this closed loop may be determined as:

$$T(Y)=\text{measured group delay }(Tx1 \to Rx0)=T(Tx1)+T(Rx0) \quad \text{eq. 11}$$

Another waveform signal may be played through the secondary path 720 (Tx1 path), and the group delay measured via the primary receive 730 (Rx2 path) closing the loop. The delay in the transmission path (Tx1) and the reception path (Rx2) for this closed loop may be determined as:

$$T(Z)=\text{measured group delay }(Tx1 \to Rx2)=T(Tx1)+T(Rx2) \quad \text{eq. 12}$$

Based on the measured group delays for the various closed loops, the group delay within the primary path 710 [T(Tx0)+R(Rx0)] up to and including the switch 912 may be determined, with the pre-characterized delay T(951) from components 713, 714, and 715 obtained and included in the primary delay as follows:

$$[T(Tx0)+T(Rx0)]=T(X)-T(Z)+T(Y)+2*T(951) \quad \text{eq. 13}$$

Similarly, based on the measured group delays for the various closed loops, the group delay within the primary path 710 [T(Tx1)+R(Rx1)] up to and including the switch 912 may be determined with the pre-characterized delay T(952) from components 723, 724, and 725 obtained and included in the primary delay as follows:

$$[T(Tx1)+T(Rx1)]=T(Z)-T(X)+T(W)+2*T(952) \quad \text{eq. 14}$$

In some implementations, it may be desirable to reduce the measured group delay by the delay due to the coupling path between the switches 912, 922, and 932, which may be determined based on the circuit trace length between the switches.

In another implementation, the conductive closed loop may be within the transceiver 704. For example, a switch system may be included in the transceiver 704 so that a waveform signal may be routed to couple the transmission output path to the reception input paths. As illustrated in FIG. 9, for example, a conductive closed loop within the transceiver, will not account for delays for all of the components within the box 960 shown in FIG. 9. Thus, while the conductive closed loop within the transceiver 704 will include any group delay variation across temperature of the DACs, ADCs, modulators and demodulators in the transceiver, it will not account for group delay in the RFFE, e.g., within box 960. Accordingly, the group delay due to components in box 960 may be pre-characterized and included in the determination of the group delay.

Figure 11:
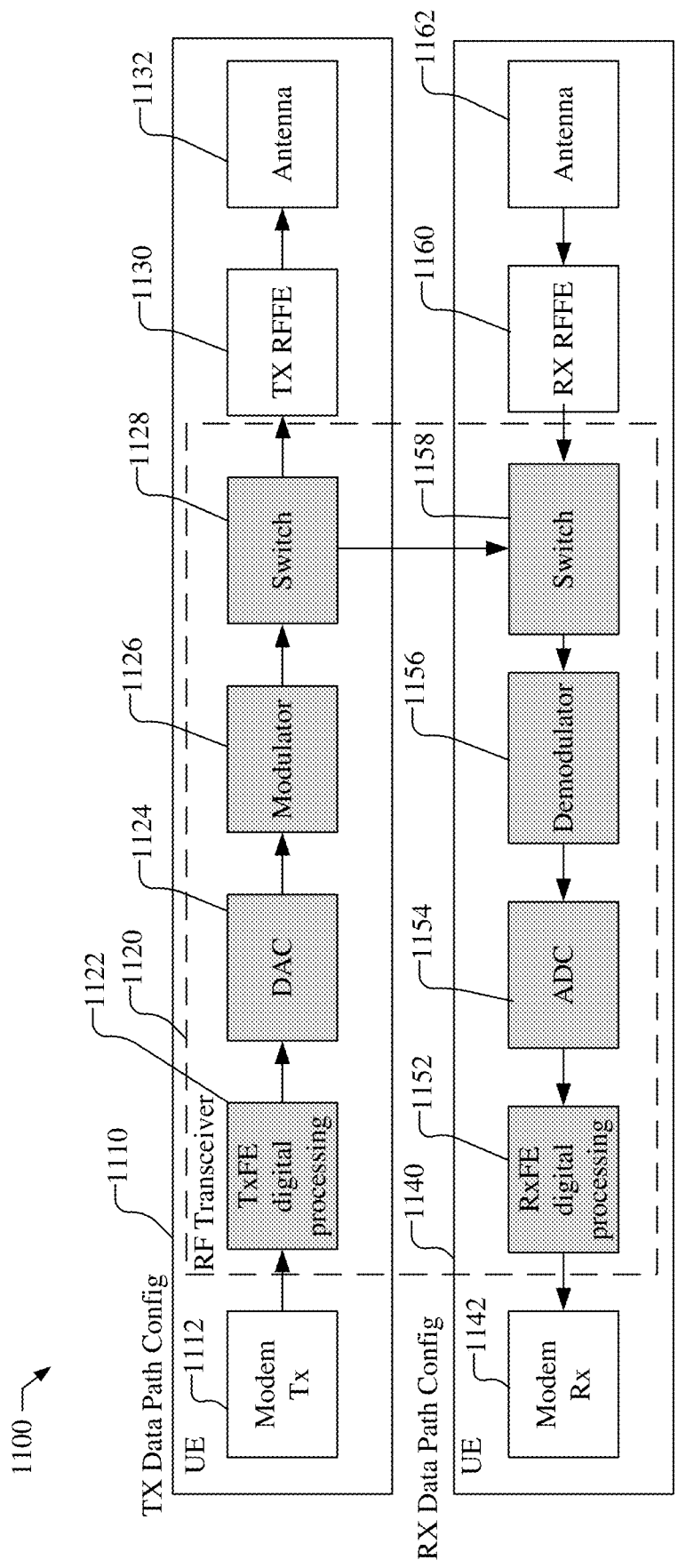
FIG. 11 illustrates an example embodiment a front end structure of a UE with a conductive closed loop within the transceiver.

FIG. 11, for example, illustrates the front end structure 1100 of a UE 115, with a conductive closed loop within the transceiver 1120. As illustrated, the front end structure 1100 may include transmit data path configuration 1110 that includes a modem transmit module 1112 that is connected to the RF transceiver 1120, which includes a transmit front end (TxFE) digital processing module 1122 (e.g., a transmission digital signal processor), a digital to analog converter (DAC) 1124, an analog transmit modulator 1126, and a switch 1128, which is connected to the transmit radio frequency front end (Tx RFFE) 1130 and the antenna assembly 1132. A receive data path configuration 1140 that includes a modem receive module 1142 that is connected to the RF transceiver 1120, which includes a receive front end (RxFE) digital processing module 1152 (e.g., a receive digital signal processor), an analog to digital converter (ADC) 1154, an analog receive demodulator 1156, and a switch 1158, which is connected to the receive radio frequency front end (Rx RFFE) 1160 and the antenna assembly 1162.

As illustrated, in one implementation of the group delay calibration, the conductive closed loop may be within the transceiver 1120, by connecting switch 1128 and switch 1158 so that the waveform signal may be routed to couple the transmission output path to the reception input paths with the transceiver 1120. The group delay may be determined as the transmission and reception times, i.e., T(Tx1)+T(Rx1), in addition to the delay in the transmit radio frequency front end (Tx RFFE) 1130 and the receive front end (Rx RFFE) 1160, which may be pre-characterized and stored in the UE 115.

It should be understood that the conductive closed loops shown in FIGS. 9, 10, and 11 are examples, and that conductive closed loops may be formed in other locations within either the transceiver or the RFFE.

Figure 12:
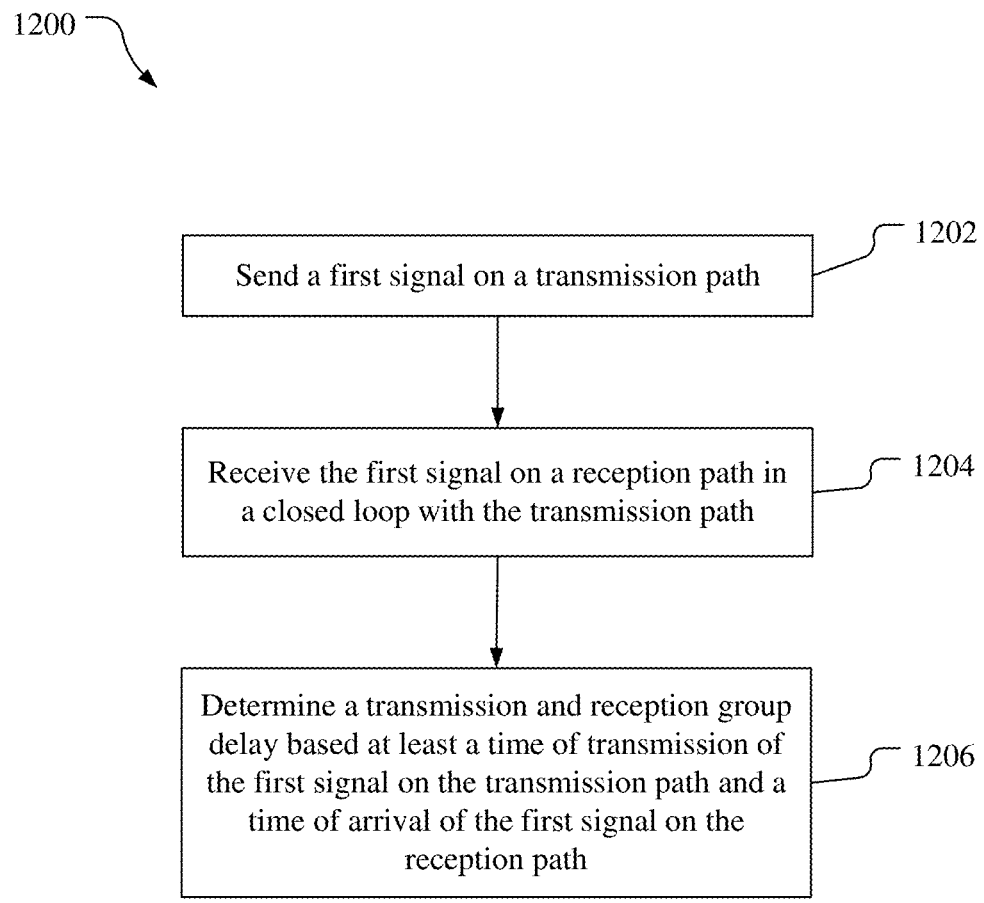
FIG. 12 illustrates an exemplary method of calibration of group delay in a mobile device in a wireless network.

FIG. 12 illustrates an exemplary method 1200 of calibration of group delay in a mobile device in a wireless network. As illustrated at block 1202, a first signal may be sent on a transmission path, e.g., as discussed with respect to FIGS. 5, 7, 8, 9, 10, and 11. By way of example, a means for sending a first signal on a transmission path may be, e.g., the modem processor 432, the modem 702, and the one or more processors 410 with dedicated hardware or implementing executable code or software instructions in memory 411, such as the closed loop module 472. The calibration process may be initiated, e.g., by the modem processor 432 or by the application processor 430 using an API that can be a trigger under the OS stack, part of the OS, or by an application above the OS. In some implementations, a master controller (such as a location server) that is external to the mobile device may be used to instruct the device to initiate the calibration of the group delay.

At block 1204, the first signal is received on a reception path in a closed loop with the transmission path, e.g., as discussed with respect to FIGS. 5, 7, 8, 9, 10, and 11. By way of example, a means for receiving the first signal on a reception path in a closed loop with the transmission path may be, e.g., the modem processor 432, the modem 702, and the one or more processors 410 with dedicated hardware or implementing executable code or software instructions in memory 411, such as the closed loop module 472.

At block 1206, a transmission and reception group delay may be determined based at least a time of transmission of the first signal on the transmission path and a time of arrival of the first signal on the reception path, e.g., as discussed with respect to FIGS. 5, 7, 8, 9, 10, and 11. A means for determining a transmission and reception group delay based at least a time of transmission of the first signal on the transmission path and a time of arrival of the first signal on the reception path may be, e.g., the modem processor 432, the modem 702, and the one or more processors 410 with dedicated hardware or implementing executable code or software instructions in memory 411, such as the closed loop module 472.

In some implementations, the closed loop may be a near field radiated closed loop that includes a first antenna of the mobile device that transmits the first signal and a second antenna of the mobile device that receives the first signal, e.g., as discussed with respect to FIGS. 5, 7, and 8. For example, the transmission and reception group delay may be determined further based on reducing a first time between the time of transmission and the time of arrival by a second time associated with a coupling path between the first antenna and the second antenna, e.g., as discussed with respect to FIGS. 5, 7, and 8. In some implementations, the transmission path may be a primary transmission path that includes the first antenna and the reception path may be a secondary reception path that includes the second antenna, and the mobile device further may include a primary reception path that includes the first antenna and a secondary transmission path that includes the second antenna. The method, for example, may include sending at least one additional signal on the primary transmission path and receiving the at least one additional signal on a third reception path, e.g., as discussed with respect to coupling path 752 in FIG. 7. The method may further include sending a plurality of signals on the secondary transmission path and receiving each signal from the plurality of signals on a different reception path, including at least the primary reception path and the third reception path, e.g., as discussed with respect to coupling paths 851 and 852 in FIG. 8. The transmission and reception group delay may be determined by determining a first group delay for the primary transmission path and the primary reception path and a second group delay for the secondary transmission path and the secondary reception path based on times of departure and times of arrivals of transmitted signals and received signals, e.g., as discussed with respect to FIGS. 7 and 8. In some implementations, the mobile device further may include a fourth reception path, e.g., as discussed with respect to FIGS. 7 and 8. A means for sending at least one additional signal on the primary transmission path and receiving the at least one additional signal on a third reception path may be, e.g., the modem processor 432, the modem 702, and the one or more processors 410 with dedicated hardware or implementing executable code or software instructions in memory 411, such as the closed loop module 472. The means for sending a plurality of signals on the secondary transmission path and receiving each signal from the plurality of signals on a different reception path, including at least the primary reception path and the third reception path may be, e.g., the modem processor 432, the modem 702, and the one or more processors 410 with dedicated hardware or implementing executable code or software instructions in memory 411, such as the closed loop module 472. A means for determining a first group delay for the primary transmission path and the primary reception path and a second group delay for the secondary transmission path and the secondary reception path based on times of departure and times of arrivals of transmitted signals and received signals may be, e.g., the modem processor 432, the modem 702, and the one or more processors 410 with dedicated hardware or implementing executable code or software instructions in memory 411, such as the closed loop module 472.

In some implementations, the closed loop may be a conducted closed loop, e.g., as discussed with respect to FIGS. 5, 9, 10, and 11. For example, in some implementations, the conducted closed loop may be within a transceiver, and the method may further include switchably coupling an output terminal of a modulator in the transmission path to an input terminal of a demodulator in the reception path in the transceiver to receive the first signal on the reception path in the conducted closed loop, e.g., as discussed in FIGS. 5, 9, 10, and 11 A means for switchably coupling an output terminal of a modulator in the transmission path to an input terminal of a demodulator in the reception path in the transceiver to receive the first signal on the reception path in the conducted closed loop, e.g., may be the closed loop 546 in FIG. 5 or switches 1128 and 1158 in FIG. 11. In one example, the transmission and reception group delay may be determined further based on a predetermined characterization of delay in the transmission path between the output terminal of the modulator to an antenna and the reception path between the antenna and the input terminal of the demodulator, e.g., as discussed in FIGS. 5, 9, 10, and 11.

In some examples, the conducted closed loop may be within a radio frequency (RF) switch network and may include a transceiver and power amplifier, e.g., as discussed with respect to FIGS. 5, 9, and 10. For example, the transmission path may be a primary transmission path that includes a first switch in the RF switch network and the reception path is a secondary reception path that includes a second switch in the RF switch network and the mobile device may further include a primary reception path that includes the first switch and a secondary transmission path that includes the second switch. The method may further include switchably coupling the first switch in the primary transmission path to the second switch in the secondary reception path to receive the first signal on the reception path in the conducted closed loop, e.g., as discussed with respect to FIG. 9. The method may further include switchably coupling the first switch in the primary transmission path to a third switch in a third reception path and sending a second signal on the primary transmission path and receiving the second signal on the third reception path, e.g., as discussed with respect to FIG. 9. The method may further include switchably coupling the second switch in the secondary transmission path to the first switch in the primary reception path and sending a third signal on the secondary transmission path and receiving the third signal on the primary reception path, e.g., as discussed with respect to FIG. 10. The method may further include switchably coupling the second switch in the secondary transmission path to the third switch in the third reception path and sending a fourth signal on the secondary transmission path and receiving the fourth signal on the third reception path, e.g., as discussed with respect to FIG. 10. The transmission and reception group delay may be determined by determining a first group delay for the primary transmission path and the primary reception path and a second group delay for the secondary transmission path and the secondary reception path based on times of departure and times of arrivals of transmitted and received first signal, second signal, third signal, and fourth signal, e.g., as discussed with respect to FIGS. 9 and 10. For example, a means for switchably coupling the first switch in the primary transmission path to the second switch in the secondary reception path to receive the first signal on the reception path in the conducted closed loop may be, e.g., the CL_B output of switch 912 and the CL_In input of switch 922 shown in FIG. 9. A means for switchably coupling the first switch in the primary transmission path to a third switch in a third reception path and sending a second signal on the primary transmission path and receiving the second signal on the third reception path may be, e.g., the CL_A output of switch 912 and the CL_In input of switch 932 shown in FIG. 9. A means for switchably coupling the second switch in the secondary transmission path to the first switch in the primary reception path and sending a third signal on the secondary transmission path and receiving the third signal on the primary reception path may be, e.g., the CL_A output of switch 922 and the CL_In input of switch 912 shown in FIG. 10. A means for switchably coupling the second switch in the secondary transmission path to the third switch in the third reception path and sending a fourth signal on the secondary transmission path and receiving the fourth signal on the third reception path may be, e.g., the CL_B output of switch 922 and the CL_In input of switch 932 shown in FIG. 10. A means for determining a first group delay for the primary transmission path and the primary reception path and a second group delay for the secondary transmission path and the secondary reception path based on times of departure and times of arrivals of transmitted and received first signal, second signal, third signal, and fourth signal may be, e.g., the modem processor 432, the modem 702, and the one or more processors 410 with dedicated hardware or implementing executable code or software instructions in memory 411, such as the closed loop module 472. The transmission and reception group delay may be further based on a predetermined characterization of delay in the transmission path between the RF switch network and an antenna, including a radio frequency filter and in the reception path between the antenna and the RF switch network, including the radio frequency filter, e.g., as discussed in FIGS. 9 and 10.

In one implementation, during the positioning process one or more components in at least one of the transmission path and the reception path are bypassed, and determining the transmission and reception group delay is further based on a predetermined characterization of delay in the transmission path and the reception path between the conducted closed loop and an antenna that excludes delay due to the one or more one or more components, e.g., as discussed in FIGS. 5, 9, and 10. In one implementation, during the positioning process one or more components in at least one of the transmission path and the reception path are bypassed, and the method may further include bypassing the one or more components in at least one of the transmission path and the reception path when sending and receiving the first signal, e.g., as discussed in FIGS. 5, 7, and 8. A means for bypassing the one or more components in at least one of the transmission path and the reception path when sending and receiving the first signal may be, e.g., the modem processor 432, the modem 702, and the one or more processors 410 with dedicated hardware or implementing executable code or software instructions in memory 411, such as the closed loop module 472.

In one implementation, the method may further include determining a desired accuracy of a positioning process, e.g., as discussed in reference to FIG. 6. The calibration of group delay with the closed loop may be performed in response to the desired accuracy, e.g., as discussed in reference to FIG. 6. A means for determining a desired accuracy of a positioning process, may be, e.g., the modem processor 432, the modem 702, and the one or more processors 410 with dedicated hardware or implementing executable code or software instructions in memory 411, such as the closed loop module 472. A means for performing the calibration of group delay with the closed loop in response to the desired accuracy may be, e.g., the modem processor 432, the modem 702, and the one or more processors 410 with dedicated hardware or implementing executable code or software instructions in memory 411, such as the closed loop module 472. For example, in one implementation, the method may include determining a second desired accuracy of a second positioning process, and performing a second calibration of group delay using a predetermined characterization of the transmission and reception group delay in response to the second desired accuracy, e.g., as discussed at blocks 610 and 612 of FIG. 6. A means for determining a second desired accuracy of a second positioning process, and performing a second calibration of group delay using a predetermined characterization of the transmission and reception group delay in response to the second desired accuracy may be, e.g., the modem processor 432, the modem 702, and the one or more processors 410 with dedicated hardware or implementing executable code or software instructions in memory 411, such as the closed loop module 472.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method of calibration of group delay within a mobile device in a wireless network, the method comprising:
   sending a first signal on a transmission path;
   receiving the first signal on a reception path, wherein the first signal sent on the transmission path by the mobile device is fed back by the mobile device in a closed loop and received by the mobile device on the reception path, wherein the closed loop comprises a near field radiated closed loop that includes a first antenna of the mobile device that transmits the first signal and a second antenna of the mobile device that receives the first signal;
   determining a transmission and reception group delay within the mobile device based on at least (1) a time of transmission of the first signal on the transmission path at a modem, (2) a time of arrival of the first signal on the reception path at the modem, and (3) a reduction in a first time between the time of transmission and the time of arrival by a second time associated with a coupling path between the first antenna and the second antenna; and setting a measured processing delay of the mobile device based on the transmission and reception group delay within the mobile device.

2. The method of claim 1, wherein the transmission path comprises a primary transmission path that includes the first antenna and the reception path is a secondary reception path that includes the second antenna, wherein the mobile device further has a primary reception path that includes the first antenna and a secondary transmission path that includes the second antenna, the method further comprising:
  sending at least one additional signal on the primary transmission path and receiving the at least one additional signal on a third reception path; and
  sending a plurality of signals on the secondary transmission path and receiving each signal from the plurality of signals on a different reception path, including at least the primary reception path and the third reception path;
  wherein determining the transmission and reception group delay further comprises determining a first group delay for the primary transmission path and the primary reception path and a second group delay for the secondary transmission path and the secondary reception path based on times of departure and times of arrivals of transmitted signals and received signals.

3. The method of claim 2, wherein the mobile device further comprises a fourth reception path.

4. The method of claim 1, wherein the first signal sent on the transmission path by the mobile device is fed back by the mobile device in a second closed loop, wherein the second closed loop comprises a conducted closed loop, further comprising:
  determining a second transmission and reception group delay within the mobile device based on at least a second time of transmission of the first signal on the transmission path at the modem and a second time of arrival of the first signal on the reception path via the second closed loop at the modem; and
  setting a second measured processing delay of the mobile device based on the second transmission and reception group delay within the mobile device.

5. The method of claim 4, wherein the conducted closed loop is within a transceiver, the method further comprising switchably coupling an output terminal of a modulator in the transmission path to an input terminal of a demodulator in the reception path in the transceiver to receive the first signal on the reception path in the conducted closed loop.

6. The method of claim 5, wherein determining the second transmission and reception group delay is further based on a predetermined characterization of delay in the transmission path between the output terminal of the modulator to an antenna and the reception path between the antenna and the input terminal of the demodulator.

7. The method of claim 4, wherein the conducted closed loop is within a radio frequency (RF) switch network and includes a transceiver and a power amplifier.

8. The method of claim 7, wherein the transmission path is a primary transmission path that includes a first switch in the RF switch network and the reception path is a secondary reception path that includes a second switch in the RF switch network, wherein the mobile device further has a primary reception path that includes the first switch and a secondary transmission path that includes the second switch, the method further comprising:
  switchably coupling the first switch in the primary transmission path to the second switch in the secondary reception path to receive the first signal on the reception path in the conducted closed loop;
  switchably coupling the first switch in the primary transmission path to a third switch in a third reception path and sending a second signal on the primary transmission path and receiving the second signal on the third reception path;
  switchably coupling the second switch in the secondary transmission path to the first switch in the primary reception path and sending a third signal on the secondary transmission path and receiving the third signal on the primary reception path; and
  switchably coupling the second switch in the secondary transmission path to the third switch in the third reception path and sending a fourth signal on the secondary transmission path and receiving the fourth signal on the third reception path;
  wherein determining the second transmission and reception group delay further comprises determining a first group delay for the primary transmission path and the primary reception path and a second group delay for the secondary transmission path and the secondary reception path based on times of departure and times of arrivals of transmitted and received first signal, second signal, third signal, and fourth signal.

9. The method of claim 7, wherein determining the second transmission and reception group delay is further based on a predetermined characterization of delay in the transmission path between the RF switch network and an antenna, including a radio frequency filter and in the reception path between the antenna and the RF switch network, including the radio frequency filter.

10. The method of claim 4, wherein, during a positioning process, one or more components in at least one of the transmission path and the reception path are bypassed, wherein determining the second transmission and reception group delay is further based on a predetermined characterization of delay in the transmission path and the reception path between the conducted closed loop and an antenna that excludes a delay due to the one or more components.

11. The method of claim 1, wherein, during a positioning process, one or more components in at least one of the transmission path and the reception path are bypassed, the method further comprising bypassing the one or more components in at least one of the transmission path and the reception path when sending and receiving the first signal.

12. The method of claim 1, further comprising:
  determining a desired accuracy of a positioning process, wherein the calibration of group delay with the closed loop is performed in response to the desired accuracy.

13. The method of claim 12, further comprising:
  determining a second desired accuracy of a second positioning process; and
  performing a second calibration of group delay using a predetermined characterization of the transmission and reception group delay in response to the second desired accuracy.

14. The method of claim 1, wherein determining the transmission and reception group delay within the mobile device is further based on a difference between the time of transmission of the first signal on the transmission path and the time of arrival of the first signal on the reception path.

15. A mobile device in a wireless network configured for calibration of group delay, the mobile device comprising:
  a transceiver;
  a plurality of power amplifiers coupled to the transceiver;
  a plurality of bandpass filters coupled to the plurality of power amplifiers;

an antenna array coupled to the plurality of bandpass filters; and at least one processor configured to:
send a first signal on a transmission path through one or more of the transceiver, amplifier, bandpass filters, and the antenna array;
receive the first signal on a reception path, wherein the first signal sent on the transmission path by the mobile device is fed back by the mobile device in a closed loop and received by the mobile device on the reception path through the one or more of the transceiver, amplifier, bandpass filters, and the antenna array, wherein the closed loop comprises a near field radiated closed loop that includes a first antenna of the mobile device that transmits the first signal and a second antenna of the mobile device that receives the first signal;
determine a transmission and reception group delay within the mobile device based on at least (1) a time of transmission of the first signal on the transmission path at a modem, (2) a time of arrival of the first signal on the reception path at the modem, (3) a reduction in a first time between the time of transmission and the time of arrival by a second time associated with a coupling path between the first antenna and the second antenna; and
set a measured processing delay of the mobile device based on the transmission and reception group delay within the mobile device.

16. The mobile device of claim 15, wherein the transmission path comprises a primary transmission path that includes the first antenna and the reception path is a secondary reception path that includes the second antenna, wherein the mobile device further has a primary reception path that includes the first antenna and a secondary transmission path that includes the second antenna, wherein the at least one processor is further configured to:
send at least one additional signal on the primary transmission path and to receive the at least one additional signal on a third reception path; and
send a plurality of signals on the secondary transmission path and to receive each signal from the plurality of signals on a different reception path, including at least the primary reception path and the third reception path;
wherein the at least one processor is configured to determine the transmission and reception group delay by being configured to determine a first group delay for the primary transmission path and the primary reception path and a second group delay for the secondary transmission path and the secondary reception path based on times of departure and times of arrivals of transmitted signals and received signals.

17. The mobile device of claim 16, wherein the mobile device further comprises a fourth reception path.

18. The mobile device of claim 15, wherein the first signal sent on the transmission path by the mobile device is fed back by the mobile device in a second closed loop and received by the mobile device on the reception path through the one or more of the transceiver, amplifier, bandpass filters, and the antenna array, wherein the second closed loop is a conducted closed loop, wherein the measured processing delay of the mobile device comprises a variable for a round trip time (RTT) measurement, wherein the at least one processor is further configured to:
determine a second transmission and reception group delay within the mobile device based on at least a second time of transmission of the first signal on the transmission path at the modem and a second time of arrival of the first signal on the reception path via the second closed loop at the modem; and
set a second measured processing delay of the mobile device based on the second transmission and reception group delay within the mobile device.

19. The mobile device of claim 18, wherein the conducted closed loop is within the transceiver, wherein the at least one processor is further configured to switchably couple an output terminal of a modulator in the transmission path in the transceiver to an input terminal of a demodulator in the reception path in the transceiver to receive the first signal on the reception path in the conducted closed loop.

20. The mobile device of claim 19, wherein the at least one processor is further configured to:
determine the second transmission and reception group delay further based on a predetermined characterization of delay in the transmission path between the output terminal of the modulator to an antenna and the reception path between the antenna and the input terminal of the demodulator.

21. The mobile device of claim 18, wherein the conducted closed loop is within a radio frequency (RF) switch network between the plurality of power amplifiers and the plurality of bandpass filters and includes the transceiver and the plurality of power amplifiers.

22. The mobile device of claim 21, wherein the transmission path is a primary transmission path that includes a first switch in the RF switch network and the reception path is a secondary reception path that includes a second switch in the RF switch network, wherein the mobile device further has a primary reception path that includes the first switch and a secondary transmission path that includes the second switch, wherein the at least one processor is further configured to:
switchably couple the first switch in the primary transmission path to the second switch in the secondary reception path to receive the first signal on the reception path in the conducted closed loop;
switchably couple the first switch in the primary transmission path to a third switch in a third reception path and to send a second signal on the primary transmission path and to receive the second signal on the third reception path;
switchably couple the second switch in the secondary transmission path to the first switch in the primary reception path and to send a third signal on the secondary transmission path and to receive the third signal on the primary reception path; and
switchably couple the second switch in the secondary transmission path to the third switch in the third reception path and to send a fourth signal on the secondary transmission path and to receive the fourth signal on the third reception path;
wherein the at least one processor is configured to determine the second transmission and reception group delay by being configured to determine a first group delay for the primary transmission path and the primary reception path and a second group delay for the secondary transmission path and the secondary reception path based on times of departure and times of arrivals of transmitted and received first signal, second signal, third signal, and fourth signal.

23. The mobile device of claim 21, wherein the at least one processor is further configured to:
determine the second transmission and reception group delay based on a predetermined characterization of delay in the transmission path between the RF switch network and an antenna, including a bandpass filter and in the reception path between the antenna and the RF switch network, including the bandpass filter.

24. The mobile device of claim 18, wherein, during a positioning process, one or more components in at least one of the transmission path and the reception path are bypassed, wherein the at least one processor is configured to:
   determine the second transmission and reception group delay further based on a predetermined characterization of delay in the transmission path and the reception path between the conducted closed loop and an antenna that excludes delay due to the one or more components.

25. The mobile device of claim 15, wherein, during a positioning process, one or more components in at least one of the transmission path and the reception path are bypassed, the at least one processor is further configured to:
   bypass the one or more components in at least one of the transmission path and the reception path when sending and receiving the first signal.

26. The mobile device of claim 15, wherein the at least one processor is further configured to:
   determine a desired accuracy of a positioning process; and
   perform the calibration of group delay with the closed loop in response to the desired accuracy.

27. The mobile device of claim 26, wherein the at least one processor is further configured to:
   determine a second desired accuracy of a second positioning process; and
   perform a second calibration of group delay using a predetermined characterization of the transmission and reception group delay in response to the second desired accuracy.

28. A mobile device in a wireless network configured for calibration of group delay, the mobile device comprising:
   means for sending a first signal on a transmission path;
   means for receiving the first signal on a reception path, wherein the first signal sent on the transmission path by the mobile device is fed back by the mobile device in a closed loop and received by the mobile device on the reception path, wherein the closed loop comprises a near field radiated closed loop that includes a first antenna of the mobile device that transmits the first signal and a second antenna of the mobile device that receives the first signal;
   means for determining a transmission and reception group delay within the mobile device based on at least (1) a time of transmission of the first signal on the transmission path at a modem, (2) a time of arrival of the first signal on the reception path at the modem, and (3) a reduction in a first time between the time of transmission and the time of arrival by a second time associated with a coupling path between the first antenna and the second antenna; and
   means for setting a measured processing delay of the mobile device based on the transmission and reception group delay within the mobile device.

29. A non-transitory storage medium including program code stored thereon, the program code is operable to configure at least one processor in a mobile device in a wireless network configured for calibration of group delay, comprising:
   program code to send a first signal on a transmission path;
   program code to receive the first signal on a reception path, wherein the first signal sent on the transmission path by the mobile device is fed back by the mobile device in a closed loop and received by the mobile device on the reception path, wherein the closed loop comprises a near field radiated closed loop that includes a first antenna of the mobile device that transmits the first signal and a second antenna of the mobile device that receives the first signal;
   program code to determine a transmission and reception group delay within the mobile device based on at least (1) a time of transmission of the first signal on the transmission path at a modem, (2) a time of arrival of the first signal on the reception path at the modem, and (3) a reduction in a first time between the time of transmission and the time of arrival by a second time associated with a coupling path between the first antenna and the second antenna; and
   program code to set a measured processing delay of the mobile device based on the transmission and reception group delay within the mobile device.

* * * * *